(12) United States Patent
Miller et al.

(10) Patent No.: US 12,072,304 B2
(45) Date of Patent: Aug. 27, 2024

(54) SYSTEMS AND METHODS FOR PERFORMING SERIAL ELECTRON DIFFRACTION NANOCRYSTALLOGRAPHY

(71) Applicants: R. J. Dwayne Miller, Mississauga (CA); Robert Bücker, Hamburg (DE); Günther Kassier, Hamburg (DE)

(72) Inventors: R. J. Dwayne Miller, Mississauga (CA); Robert Bücker, Hamburg (DE); Günther Kassier, Hamburg (DE)

(*) Notice: Subject to any disclaimer, the term of this patent is extended or adjusted under 35 U.S.C. 154(b) by 323 days.

(21) Appl. No.: 17/428,737

(22) PCT Filed: Feb. 6, 2020

(86) PCT No.: PCT/CA2020/050154
§ 371 (c)(1),
(2) Date: Aug. 5, 2021

(87) PCT Pub. No.: WO2020/160671
PCT Pub. Date: Aug. 13, 2020

(65) Prior Publication Data
US 2022/0128493 A1   Apr. 28, 2022

Related U.S. Application Data

(60) Provisional application No. 62/802,301, filed on Feb. 7, 2019.

(51) Int. Cl.
*G01N 23/20058* (2018.01)
(52) U.S. Cl.
CPC .......... *G01N 23/20058* (2013.01); *G01N 2223/401* (2013.01)
(58) Field of Classification Search
CPC .......... G01N 23/20058; G01N 2223/401
See application file for complete search history.

(56) References Cited

U.S. PATENT DOCUMENTS 7,385,198 B2   6/2008   Taniguchi et al.
7,601,956 B2   10/2009   Sergeevich et al.
(Continued)

FOREIGN PATENT DOCUMENTS

EP   3392900 A1   10/2018
WO   2013013134 A2   1/2013

OTHER PUBLICATIONS

De la Cruz et al., "MicroED data collection with SerialEM", Ultramicro. 201, 77-80, 2019.
(Continued)

*Primary Examiner* — Nicole M Ippolito
*Assistant Examiner* — Hanway Chang
(74) *Attorney, Agent, or Firm* — HILL & SCHUMACHER

(57) ABSTRACT

Systems and methods are provided for serial, high-throughput acquisition of electron diffraction patterns from nanocrystals. Nanocrystals dispersed on a TEM grid are automatically identified from an overview image that is obtained, for example, using a dark field detector in scanning mode. Diffraction patterns are subsequently obtained from a plurality of crystals identified in the overview image by sequentially moving (e.g. scanning) the electron nanobeam relative to the crystals and collecting diffraction images using a fast electron camera. In some example embodiments, this sequence may be repeated for different tilt angles, where registration among overview images obtained at the different tilt angles is employed to position the electron nanobeam for the different tilt angles (e.g. before the sample stage is moved to interrogate a different sample region). The present methods may be automated, thereby facilitating unsupervised acquisition of arbitrarily large data sets.

27 Claims, 13 Drawing Sheets

(56) References Cited

U.S. PATENT DOCUMENTS

| | | | |
|---|---|---|---|
| 8,253,099 B2 | 8/2012 | Nicolopoulos et al. | |
| 8,476,588 B2 | 7/2013 | He et al. | |
| 8,686,359 B2 | 4/2014 | Zewail | |
| 9,147,551 B2 | 9/2015 | Luecken et al. | |
| 2020/0336646 A1* | 10/2020 | Bammes | H04N 25/673 |

OTHER PUBLICATIONS

Gallagher-Jones et al., "Latticenano-ripples revealed in peptide microcrystals by scanning electron nanodiffraction", arXiv:1810.01561, 2018.

He et al., "A method of combining STEM image with parallel beam diffraction and electron-optical conditions for diffractive imaging", Ultramicro. 107, 340-344, 2007.

Kolb et al., "Towards automated diffraction tomography: Part I—Data acquisition", Ultramicro. 107, 507-513, 2007.

Mueller, C. et al., "Fixed target matrix for femtosecond time-resolved and in situ serial micro-crystallography", Struct. Dynam. 2, 054302-1-16, 2015.

Nannenga, B. et al., "MicroED opens a new era for biological structure determination", Curr. Op. Struct. Bio. 40, 128-135, 2016.

Nannenga, B. et al., "MicroED: a versatile cryoEM method for structure determination", Emerg. Topics Life Sci. 2, 1-6, 2018.

Nederlof, E. et al., "A Medipix quantum area detector allows rotation electron diffraction data collection from submicrometre three-dimensional protein crystals", Acta Cryst. D69, 1223-1230, 2013.

Chapman, H. et al., "Femtosecond X-ray protein nanocrystallography", Nature 470, 73-78, 2011.

De la Cruz et al., "Atomic-resolution structures from fragmented protein crystals with the cryoEM method MicroED", Nature Methods 14, 399-404, 2017.

Clabbers, M. T. B. et al., "Protein structure determination by electron diffraction using a single three-dimensional hanocrystal", Acta Cryst. D73, 738-748, 2017.

Shi, D. et al., "Three-dimensional electron crystallography of protein microcrystals", eLife 1-17, 2013.

Smeets, S. et al., "Serial electron crystallography: merging diffraction data through rank aggregation", J. Appl. Cryst. 50, 885-892, 2017.

Smeets, S. et al., "Serial electron crystallography for structure determination and phase analysis of nanocrystalline materials", J. Appl. Cryst. 51, Sup. 1-7, 2018.

Smeets, S. et al., "Serial electron crystallography for structure determination and phase analysis of nanocrystalline materials", J. Appl. Cryst. 51, 1262-1273, 2018.

Zuo et al., "Atomic Resolution Imaging of a Carbon Nanotube from Diffraction Intensities", Science 300, 1419-1421, 2003.

International Search report for PCT/CA2020/050154 dated May 29, 2020.

\* cited by examiner

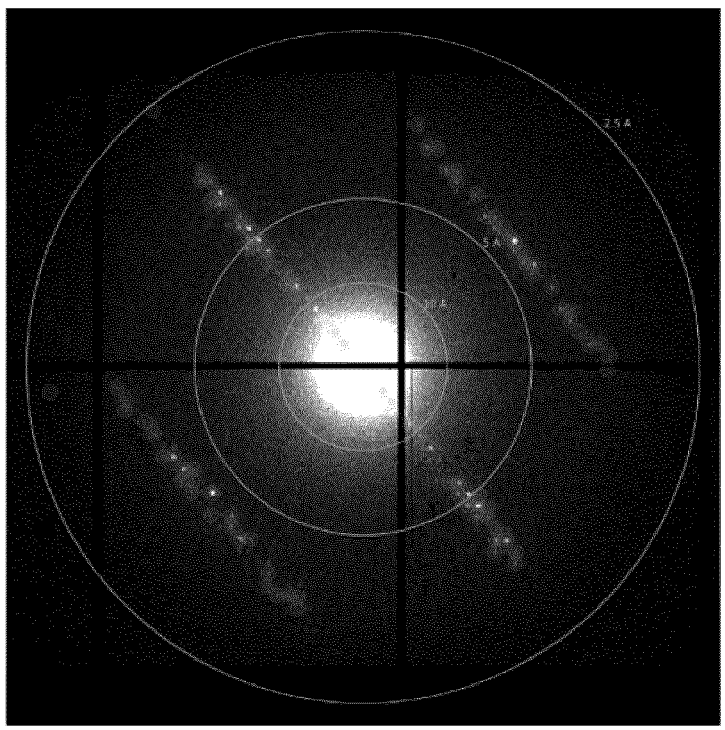
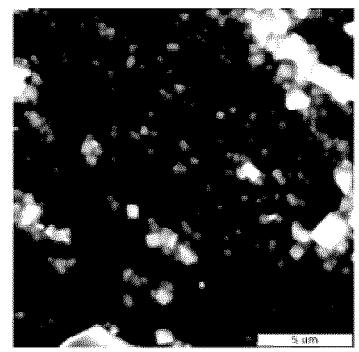
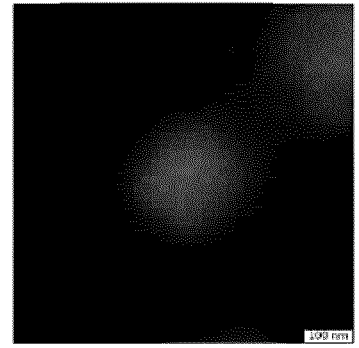
FIG. 8A  FIG. 8B
FIG. 8C

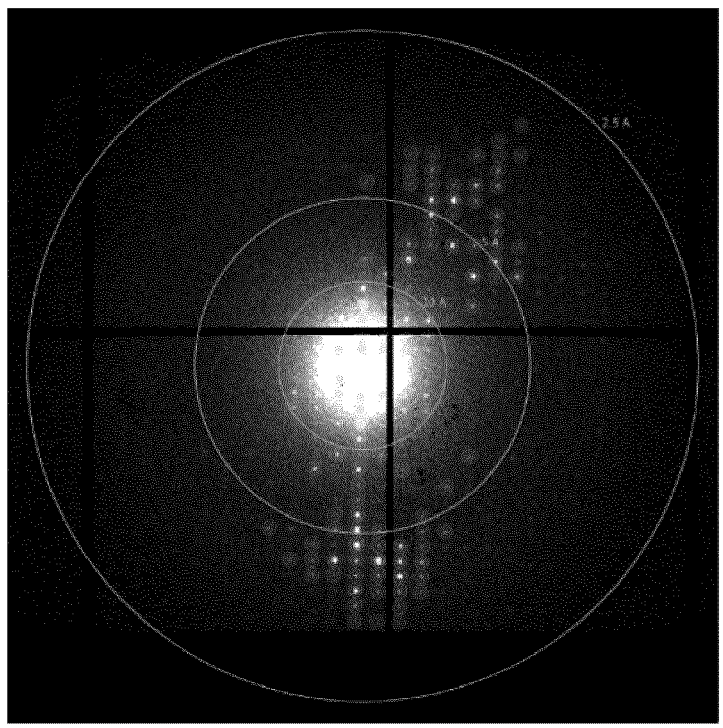
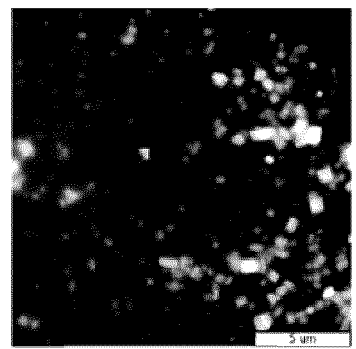
FIG. 9B
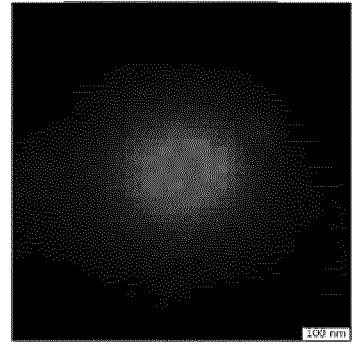
FIG. 9A    FIG. 9C

SYSTEMS AND METHODS FOR PERFORMING SERIAL ELECTRON DIFFRACTION NANOCRYSTALLOGRAPHY

CROSS-REFERENCE TO RELATED APPLICATION

This application is a National Phase application claiming the benefit of the international PCT Patent Application No. PCT/CA2020/050154, filed on Feb. 6, 2020, in English, which claims priority to U.S. Provisional Patent Application No. 62/802,301, titled "SYSTEMS AND METHODS FOR PERFORMING SERIAL ELECTRON DIFFRACTION NANOCRYSTALLOGRAPHY" and filed on Feb. 7, 2019, the entire contents of which are incorporated herein by reference.

BACKGROUND

During the past few years, several novel techniques for crystallographic structure determination of biological macromolecules have emerged, using both X-rays and electrons as probe beams. For X-ray light sources, the availability of X-ray free-electron lasers (XFELs) has driven the development of serial crystallography. In contrast to conventional goniometer-based methods on larger crystals, diffraction from a large number of randomly oriented sub-micron sized crystals is collected at a high repetition rate, and the diffraction data merged using dedicated reconstruction codes. Apart from suppression of gradually increasing radiation damage effects during acquisition of tilt series, this approach also allows employing smaller crystals, which are often easier to obtain for hard-to-crystallize molecules such as membrane proteins. While in XFELs, the extremely high peak intensity and short pulse durations (tens of fs) allow for operation in a "diffract-before-destruction" mode, serial crystallography also has been deemed useful for synchrotron sources, where fractioning the total required signal over many single crystals helps to mitigate radiation damage. For sample delivery, common techniques used are liquid jets of crystal solution, or fixed-target chips which dramatically reduce sample consumption.

On the other hand, interest has grown in performing macromolecular crystallography using electrons in commercial electron microscopes, after some long-standing issues pertaining to dose control, cryogenic sample preparation, and sufficiently effective detectors have been overcome. Compared to X-rays, crucial advantages of using electron probes are a) the higher interaction cross sections and ease of preparing highly focused nanobeams, which allow the use of even smaller crystals, and b) the wide-spread availability of the required hardware. The need of placing vacuum-sensitive samples such as protein crystals in the vacuum of an electron beam instrument such as a transmission electron microscope (TEM) column requires sample preservation techniques such as cryogenic vitrification and schemes derived from cryo-TEM can readily be applied. Dynamical diffraction effects arising from multiple scattering, significantly complicating interpretation of the results, can be mitigated by preparing crystals of order 100 nm size, dedicated reconstruction codes, or employing precession diffraction schemes.

Recently, several groups have succeeded in solving structures from vitrified single protein crystals of sub-500 nm size using electron diffraction tomography, termed "Micro-ED". However, such protocols still require preparation and identification of high-quality crystals within a tight size bracket, e.g. through breaking of fragmented crystals, and only use a single or few crystals for an entire data set, accumulating radiation damage throughout the full acquisition. While some automated procedures are becoming available, the acquisition of Micro-ED data still involves significant manual and tedious work for identifying crystals at low dose conditions, and careful dose fractioning during exposure.

SUMMARY

Systems and methods are provided for serial, high-throughput acquisition of electron diffraction patterns from nanocrystals. Nanocrystals dispersed on a TEM grid are automatically identified from an overview image that is obtained, for example, using a dark field detector in scanning mode. Diffraction patterns are subsequently obtained from a plurality of crystals identified in the overview image by sequentially moving (e.g. scanning) the electron nanobeam relative to the crystals and collecting diffraction images using a fast electron camera. In some example embodiments, this sequence may be repeated for different tilt angles, where registration among overview images obtained at the different tilt angles is employed to position the electron nanobeam for the different tilt angles (e.g. before the sample stage is moved to interrogate a different sample region). The present methods may be automated, thereby facilitating unsupervised acquisition of arbitrarily large data sets.

Accordingly, in a first aspect, there is provided a method of performing serial electron crystallography, comprising:
  scanning an electron nanobeam among a plurality of scan locations within a sample region, the sample region comprising a plurality of crystals, and employing a detector to detect, at each scan location, a signal associated with scattered electrons, thereby collecting an image dataset mapping the sample region;
  processing the image dataset to identify crystals therein;
  determining a set of scanning parameters suitable for scanning the electron nanobeam among a respective set of crystal locations corresponding to at least a subset of the crystals identified in the image dataset;
  employing the set of scanning parameters to serially scan a collimated electron nanobeam among the respective set of crystal locations and employing a camera to collect at least one diffraction pattern at each of the crystal locations; and
  processing electron diffraction patterns obtained from at least a subset of the crystal locations to calculate a crystal structure of the crystals.

In some implementations of the method, while positioning the collimated electron nanobeam at a given crystal location, a set of electron diffraction patterns is sequentially collected, such that a net radiation dose delivered at the given crystal location is fractionated among the set of electron diffraction patterns. The set of electron diffraction patterns may be collected in the absence of a time delay between successive camera exposures. A subset of electron diffraction patterns obtained at the given crystal location may be selected for use when calculating the crystal structure. The selection of the subset of electron diffraction patterns may be made after serial scanning of the electron nanobeam among the set of crystal locations. The net dose delivered at the given crystal location may be sufficient to cause radiation damage.

The subset of electron diffraction patterns may consist of each diffraction pattern for which a corresponding radiation dose delivered to the given crystal location is less than a radiation dose threshold. The subset of electron diffraction patterns may consist of those diffraction patterns that satisfy quality criteria, such that diffraction patterns compromised by radiation damage are rejected.

When calculating the crystal structure, a first subset of electron diffraction patterns may be employed when performing indexing and a second subset of electron diffraction patterns may be employed when performing integration, wherein a radiation dose corresponding to the first subset of electron diffraction patterns is greater than a radiation dose corresponding to the set of electron diffraction patterns.

In some implementations of the method, the set of crystal locations correspond to crystals satisfying size criteria. The size criteria may be based on one or more of crystal morphology and transmitted electron intensity.

In some implementations of the method, the electron nanobeam is focused when collecting the image dataset mapping the sample region. Prior to performing serial scanning of the electron nanobeam among the set of crystal locations, the following steps may be performed: (i) obtaining an additional image dataset mapping the sample region, wherein the additional image dataset is collected with the electron nanobeam in a collimated configuration; (ii) processing the image dataset and the additional image dataset to determine positional corrections for correcting a positional offset between focused and collimated beam configurations; and (iii) applying the positional corrections when scanning the electron nanobeam.

In some implementations of the method, the electron nanobeam is collimated when collecting the image dataset mapping the sample region.

In some implementations of the method, the electron nanobeam is scanned relative to the sample region using scanning coils. The electron nanobeam may be serially scanned among the crystal locations along a plurality of scan lines, and wherein the scanning parameters are configured such that the electron nanobeam is scanned to one or more auxiliary locations to avoid hysteresis effects associated with the scanning coils.

In some implementations of the method, the electron nanobeam is scanned relative to the sample region by controlling translation of a sample stage relative to the electron nanobeam.

In some implementations of the method, the image dataset is a first image dataset, the set of crystal locations are a first set of crystal locations, and the set of scanning parameters are a first set of scanning parameters, the method further comprising, prior to processing the electron diffraction patterns to calculate the crystal structure: (i) tilting a sample stage supporting the crystals from a first angle to a second angle; (ii) scanning the electron nanobeam to collect a second image dataset mapping the sample region at the second angle; (iii) processing the first image dataset and the second image dataset to determine a coordinate transformation relating the first set of crystal locations to a second set of crystal locations associated with the second angle; (iv) determining a second set of scanning parameters suitable for scanning the electron nanobeam among the second set of crystal locations at the second angle; and (v) employing the second set of scanning parameters to serially scan the collimated electron nanobeam among the second set of crystal locations and employing the camera to collect at least one diffraction pattern at each crystal location of the second set of crystal locations. The coordinate transformation may be determined by performing image registration between the first image dataset and the second image dataset.

In some implementations of the method, the electron nanobeam is scanned using a scanning transmission electron microscope adapted to serially scan the electron nanobeam according to a custom scanning pattern determined based on the crystals identified in the image dataset.

In some implementations of the method, a timing of the collection of the diffraction patterns is synchronized with the serial scanning of the electron nanobeam.

In some implementations of the method, a dwell time of the electron nanobeam at each crystal location is determined based on a frame rate of the camera.

In some implementations of the method, the detector is a high-angle annular dark field detector.

In some implementations of the method, at least a portion of the processing of the electron diffraction patterns for the calculation of the crystal structure is performed while serially scanning the collimated electron nanobeam among the respective set of crystal locations.

In some implementations, the method further comprises: (i) processing the image dataset to determine a measure of crystal morphology for at least one crystal; and (ii) employing the measure of crystal morphology to restrict a search space of crystal orientations when performing indexing.

In some implementations, the method further comprises: (i) processing the image dataset to determine a thickness measure for at least one crystal; and (ii) employing the thickness measure to account for multiple electron scattering when performing crystal structure determination.

In another aspect, there is provided a system for performing serial electron crystallography, comprising:
  an electron beam instrument capable of scanning an electron nanobeam relative to a sample region, the electron beam instrument comprising a detector and a camera; and
  control and processing circuitry operatively coupled to the electron beam instrument, the control and processing circuitry comprising at least one processor and associated memory, the memory storing instructions executable by the at least one processor for performing operations comprising:
    controlling the electron beam instrument to scan the electron nanobeam among a plurality of scan locations within the sample region and employing a detector to detect, at each scan location, a signal associated with scattered electrons, thereby collecting an image dataset mapping the sample region;
    processing the image dataset to identify crystals therein;
    determining a set of scanning parameters suitable for scanning the electron nanobeam among a respective set of crystal locations corresponding to at least a subset of the crystals identified in the image dataset;
    employing the set of scanning parameters to serially scan a collimated electron nanobeam among the respective set of crystal locations and employing a camera to collect at least one diffraction pattern at each of the crystal locations; and
    processing electron diffraction patterns obtained from at least a subset of the crystal locations to calculate a crystal structure of the crystals.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 7A, 8A and 9A show typical lysozyme diffraction patterns from a serial acquisition according to the methods disclosed herein for different crystals. Diffraction up to a resolution of 2.5 A is observed. Peaks are labeled using the peakfinder8 algorithm contained in the CrystFEL package (T. A. White, R. A. Kirian, A. V. Martin, A. Aquila, K. Nass, A. Barty, and H. N. Chapman, J. Appl. Crystallogr. 45, 335 (2012)).

FIGS. 7B, 8B and 9B show the position of the nanocrystal within the overview image for the diffraction patterns corresponding to FIGS. 7A, 8A and 9A, respectively.

FIGS. 7C, 8C and 9C show a close-up of the respective crystal for the diffraction patterns corresponding to FIGS. 7A, 8A and 9A, respectively. The dot in the latter panel corresponds to the actual beam size of 100 nm.

DETAILED DESCRIPTION

Figure 1:
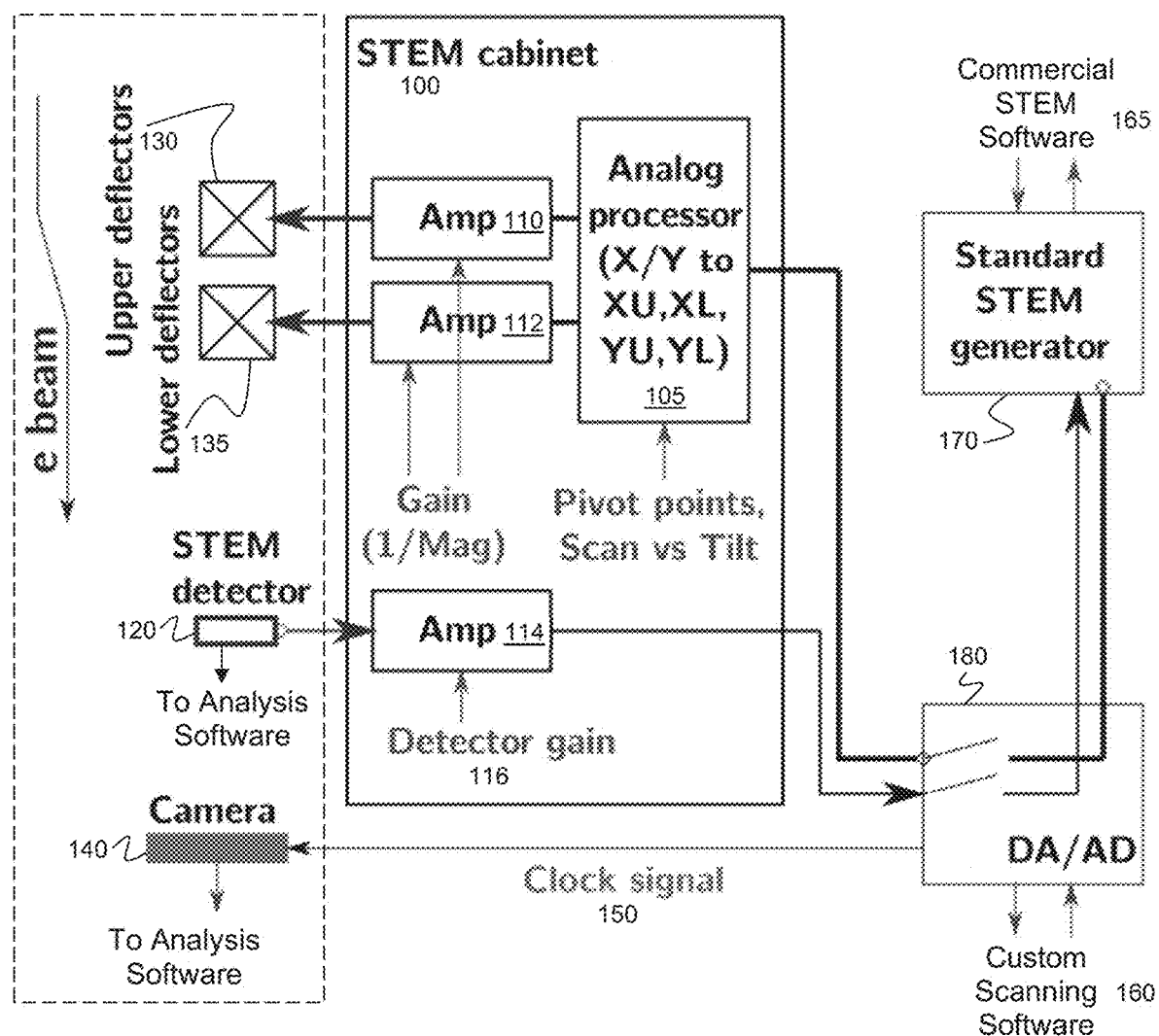
FIG. 1 shows a schematic of an example of system including a scanning transmission electron microscope (STEM) instrument that is modified for performing serial electron diffraction nanocrystallography.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 50 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As used herein, the phrase "electron nanobeam" refers to an electron beam having a sub-micrometer cross-sectional dimension.

As used herein, the phrases "dose" and "fluence" refer to the total number of probe particles delivered per unit area.

The present disclosure provides systems and methods that address the aforementioned problems involving lack of efficiency and improper dose fractioning that are associated with known electron beam nanocrystallography methods. Various example embodiments employ a serial diffraction protocol that is performed using an electron beam instrument, such as a scanning transmission electron microscope (STEM). In an initial scanning (mapping) step, an electron nanobeam is scanned relative to a sample region containing vitrified crystals and a non-imaging detector is employed to measure a signal at each nanobeam location, resulting in the collection of an overview image. The overview image is processed to locate and identify suitable crystals, thereby facilitating the location of crystals without delivering a significant electron radiation dose, and also alleviating the need for high sample homogeneity or regular arrangement of crystals on a grid. Subsequently, without requiring mode switching between TEM mode and scanning mode, a collimated electron nanobeam is scanned relative to a sample region and a fast camera is employed to record at least one diffraction pattern at each of a plurality of the crystals identified from the overview image. In some example embodiments, the crystals can be scanned several times using different tilt angles, thereby combining serial electron diffraction with tomography, which can facilitate improved peak indexing and structure refinement. In such an example embodiment, registration among overview images obtained at the different tilt angles may be employed to position the electron nanobeam accurately for the different tilt angles during the collection of diffraction patterns.

Various example embodiments for performing serial electron diffraction nanocrystallography thus employ a two-step scanning process involving (i) an initial low-dose nanocrystal search step, in which an electron nanobeam is scanned relative to nanocrystals supported on a sample grid and signals from a detector (such as a dark field detector) are processed to generate an overview image dataset, and (ii) a subsequent diffraction pattern serial detection step in which a collimated electron nanobeam is serially scanned among locations corresponding to crystals identified in the overview image and one or more diffraction images are imaged at each location using a camera. The resulting diffraction images are processed to infer the crystal structure of the nanocrystals.

In some example implementations, the two-step scanning method described above may be implemented using a STEM instrument modified to perform custom serial scanning (e.g. a STEM instrument modified to permit scripted acquisition and random scan pattern generation). An example of a modified STEM instrument is shown in FIG. 1. The STEM instrument includes a STEM electronics cabinet 100 that houses analog processing circuitry 105, upper and lower deflector amplifiers 110 and 112 and STEM detector amplifier 114 (configured with gain 116). The analog processing circuitry 105 which translates input control signals for position and tilt of the beam along perpendicular axes to output control signals for upper and lower coil currents, by means of a set of linear transformations between the former and the latter. The STEM detector amplifier 114 is connected to the STEM detector 120 (e.g. a high-angle annular dark field (HAADF) detector). The upper and lower deflector amplifiers 110 and 112 are respectively connected to the upper deflectors 130 and lower deflectors 135 (scan coils).

A camera 140 is positioned to collect electron diffraction patterns during the second scanning phase, when the electron nanobeam is scanned among locations corresponding to the crystals identified in the overview image dataset. The acquisition of image frames from the camera 140 is synchronized by the clock signal 150, which is provided externally (e.g. generated by external processing and control circuitry that is now shown FIG. 1 and is represented by the label "custom scanning software" 160). While the upper and lower deflectors (130 and 135) and the STEM detector 120 are conventionally interfaced with and controlled via the standard STEM generator 170 (which executed commercial STEM software), the modified STEM instrument is controlled according to the present example embodiment by external processing and control circuitry ("custom scanning software"), thereby facilitating custom scanning among crystals identified in the overview image dataset. This modified control of the upper and lower deflectors (130 and 135) and acquisition of signals from the STEM detector 120 may be achieved, for example, by a switch that is optionally integrated with the digital/analog device 180.

Prior to employing the modified STEM to perform electron diffraction nanocrystallography, a nanocrystal sample is prepared. It will be understood that the sample may be prepared according to a wide variety of methods. In one example implementation, a suspension of macromolecular nanocrystals may be prepared and dispersed on a supporting TEM grid. The method of preparation of the macromolecular nanocrystal suspension will generally depend on the molecule of interest, as will be understood by those skilled in the art. Non-limiting examples of suitable methods of nanocrystal solution preparation include those disclosed by Martin and Zilm (R. W. Martin and K. W. Zilm, "Preparation of protein nanocrystals and their characterization by solid state NMR," J. Magn. Reson., vol. 165, no. 1, pp. 162-174, 2003.), de la Cruz et al. (de la Cruz et al., 2017, "Atomic-Resolution Structures from Fragmented Protein Crystals with the cryoEM Method MicroED." Nature Methods 14, 399-402, doi:10.1038/nmeth.4178), and Duyvesteyn et al. ("Machining protein microcrystals for structure determination by electron diffraction." Proc. Natl. Acad. Sci. 115, 9569-9573, 2018). Further processing can consist of, but is not limited to, vitrification, where blotting of excess solution is followed by plunge-freezing the loaded grid in liquid ethane, following standard protocols of cryo-TEM, such as those disclosed by Cheng et al. (Cheng et al., 2015, "A Primer to Single-Particle Cryo-Electron Microscopy," Cell 161, 439-49, doi:10.1016/j.cell.2015.03.052015). In the example case of vacuum-stable samples, the latter step may be omitted. In an alternative example implementation, the sample may be enclosed in a vacuum-sealed environmental cell and inserted into the electron microscope using a standard sample transfer arm of suitable type.

The STEM instrument may be configured prior to the introduction of the nanocrystal sample. For example, as will be known to those skilled in the art, parameters such as beam scanning pivot points, stigmators, and lens focus presets may be aligned. Furthermore, the beam scanning range (STEM magnifications) at the desired field of view (e.g. having a spatial extent of 10-100 microns), and the effective camera lengths (sufficiently long to resolve the unit cell lattice vectors of the crystals) may be calibrated, for example, using standard test targets.

The illumination settings suitable for serial electron diffraction nanocrystallography may also be selected. For example, the STEM instrument may be configured to generate an electron nanobeam having a desired diameter (this diameter may be determined, for example, based on the average crystal size of the sample, e.g. 100-200 nm). It will be understood that the electron nanobeam may be generated according to different methods and configurations that may depend on the specific type of instrument that is employed. For example, a small (e.g. 5-20 μm diameter) condenser aperture may be inserted in a plane conjugate with the sample, and further demagnified by an electron optical system such that a small parallel beam is formed (e.g. in a standard S/TEM 2-lens condenser a demagnification of typically 50× is reached), while for 3- or 4-lens condenser systems such as found in JEOL or FEI Titan-series TEMs, more efficient configurations may be employed (see, for example, the configurations employed in Alloyeau et al., 2008 "STEM Nanodiffraction Technique for Structural Analysis of CoPt Nanoparticles." Ultramicroscopy 108 (7): 656-62, doi:10.1016/j.ultramic.2007.10.006. and in Ganesh et al. 2010, "D-STEM: A Parallel Electron Diffraction Technique Applied to Nanomaterials." Microscopy and Microanalysis 16 (5). 614-21. doi:10.1017/S1431927610000334.). If a residual beam convergence at the sample cannot be avoided, the post-sample lens (diffraction lens) foci can be shifted to obtain a focused point pattern. It is noted that such an approach may require a dedicated camera length calibration and a compensating setting of beam shift pivot points (effectively tilting the beam while scanning).

If a STEM instrument is adapted for performing the present example methods, the STEM focus settings may be determined and stored for generating (i) an electron nanobeam focused on the sample and (ii) a collimated electron nanobeam with focus in the diffraction plane. In some example implementations, a high-magnification real-space image of the collimated electron nanobeam (e.g. in the configuration used for diffraction measurements) may be collected. STEM images corresponding to the collimated beam configuration may also be obtained.

After preparing the nanocrystal sample (e.g. on a TEM grid), but prior to performing the initial scanning step involving the collection of the overview image dataset, a coarse screening of the sample may optionally be performed, for example, using low-magnification TEM or STEM or converging-beam projection image mode, in order to identify a suitable sample region of the grid. For example, a suitable sample region may be one within which the density of crystals is found to be sufficiently high (e.g. relative to a threshold or relative to other regions of the grid), while avoiding overlap, and, for example, where ice thickness is low. In one example implementation, a plurality of such regions may be identified prior to data collection and their positions may be stored in the instrument. The instrument may then automatically move the sample stage to the stored positions between acquisition from each area, thereby enabling unsupervised data collection.

Having identified a suitable sample region for analysis, the initial scanning process may be performed. As shown at 200 in FIG. 2A, the electron nanobeam is scanned among a plurality of scan locations within the sample region, without requiring any a priori knowledge of crystal location, and a detector (e.g. a dark field detector) is employed to detect, at each scan location, a signal associated with scattered electrons. The resulting set of signals and corresponding scan locations provide an overview image dataset mapping the sample region.

Figure 3A:
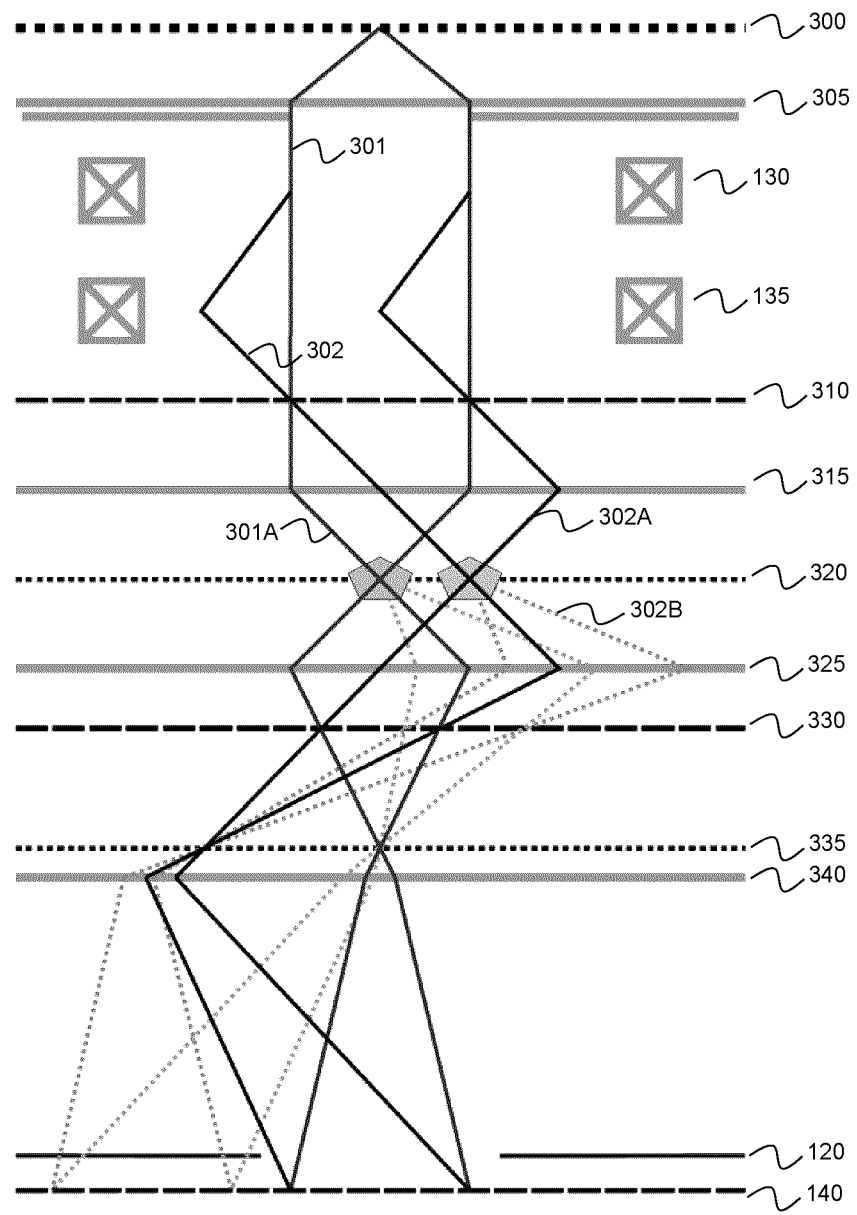
FIG. 3A shows an example of the electron beam path with the electron microscope in focusing mode for collection of an overview image while scanning the electron nanobeam relative to the crystals.

One example configuration for this initial scanning step is shown in FIG. 3A, in which the electron nanobeam is focused onto the sample. In the figure, the dashed and dotted lines show conjugate sets of planes. The figure shows both centered object marginal rays 301 and off-center object marginal rays 302, where the strongly weighted rays show the transmitted (zero-order) beams and the lightly weighted rays show the diffracted beams. The spot crossover after the first condenser lens is shown at 300, while the second condenser lens is shown at 305. After passing through the upper and lower deflectors (130/135) and the objective lens front focal plane 310, the electron beam is focused onto the sample at the sample plane 320 by the upper objective lens 315, as shown by focused rays 301A and 302A. Diffracted beams (e.g. beam 302B) are produced by the interaction of the electron beams with the sample, as shown by the lightly weighted rays. The transmitted and diffracted beams encounter the lower objective lens 325 and pass through the objective back plane 330 and subsequently the intermediate image plane 335. The beams are then focused onto the dark field detector 120 by the intermediate and projection lens system 340. While the diffraction camera 140 is shown in the figure, it is the signal from the dark field detector 120 that is processed during this initial scanning phase, in order to generate the overview image dataset.

As illustrated in FIG. 3A, the electron nanobeam is scanned in a search mode (the figure shows two different example beams) with a wide field of view (e.g. on the scale of 1-100 microns). In the present example embodiment involving a focused nanobeam, the pixel dimensions associated with the scanned beam are selected to be smaller than the size of the nanocrystals, typically within the range of 2-10 nanometers. In order to minimize the total dose, a short dwell time may be employed, such as a dwell time in the range of 1-5 microseconds, and the beam velocity may be selected to lie within the range of 3-15 nm/us. As noted above, the overview image dataset may be acquired using a dark-field detector such as an HAADF detector. It will be understood, however, that the HAADF detector is but one example of the types of detectors that may be employed during the initial scanning step. For example, in an alternative example embodiment, another type of non-imaging detector may be employed, such as, but not limited to, a bright field detector.

Referring again to FIG. 2A, after having scanned the electron nanobeam across the sample region, the resulting overview image dataset may be processed to identify crystals, as shown at 205. It will be understood that many different methods may be employed to identify crystals within the overview image, and that the suitability of a given method may depend on the type of sample under study. Non-limiting examples of identification methods include scale-space blob extraction and binarization with ensuing morphological operations and segmentation. In some example embodiments, the overview image dataset may be processed to identify nanocrystals for subsequent collection of diffraction image patterns based on selection criteria. For example, the overview image dataset may be processed to identify the nanocrystals within a prescribed lateral size and/or thickness range.

Figure 2A:
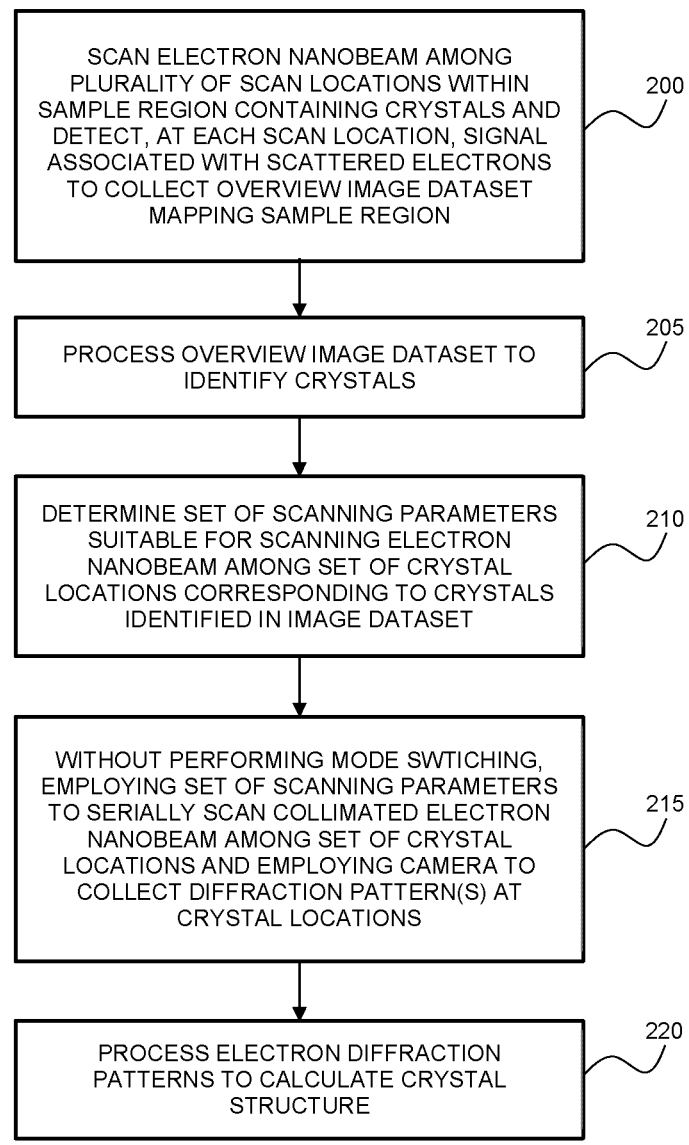
FIG. 2A is a flow chart illustrating an example method of performing serial electron diffraction nanocrystallography.

Having identified the crystals in the overview image dataset in step 205 in FIG. 2A, scanning parameters (e.g. spatial coordinates, and corresponding deflector currents) can then be determined for serially scanning the electron nanobeam among locations corresponding to identified crystals during the second scanning step of the present example method (for the collection of diffraction pattern images), as shown at step 210. In some example embodiments, the scanning parameters can be determined based on the determination of the coordinates of locations associated with the identified crystals. For example, the coordinates of a location associated with a given crystal identified in the overview image dataset may be determined, for example by determining the center of mass of a labeled region corresponding to each crystal, assigning equal weight to all pixels in that region, or using mass thickness intensities. In some implementations, two or more locations may be determined for one or more crystals. For example, a multitude of locations can be determined for a given crystal, by equally distributing their coordinates over the identified region occupied by the crystal. This can be used to increase the signal by accumulating diffraction patterns recorded (as per the following steps) from various locations, or, for example, to increase the chance of hitting an optimal scan position if the morphology of the crystal is difficult to analyze, or crystals are agglomerated.

In another example implementation, the scanning parameters for scanning the electron beam during the second phase can be determined based on the scanning parameters that were employed during the first scanning step. For example, the scanning parameters for positioning the electron nanobeam on a given nanocrystal that was identified from the overview image may be determined by obtaining the scanning parameters (e.g. deflector currents) that were employed when the electron nanobeam was directed on the given nanocrystal during the initial scanning step, in the absence of the explicit determination of spatial coordinates prescribing the location of the given nanocrystal. In other words, the second scanning step may employ the same deflector coil currents that were employed during the initial scanning step (the mapping/crystal identification step). The relation between found and subsequently acquired crystal locations may thus be defined at low level of the technology layers of the system, thereby facilitating scanning that is more efficient and less error-prone than conventional approaches that require complex and error-prone calibration steps.

Figure 3B:
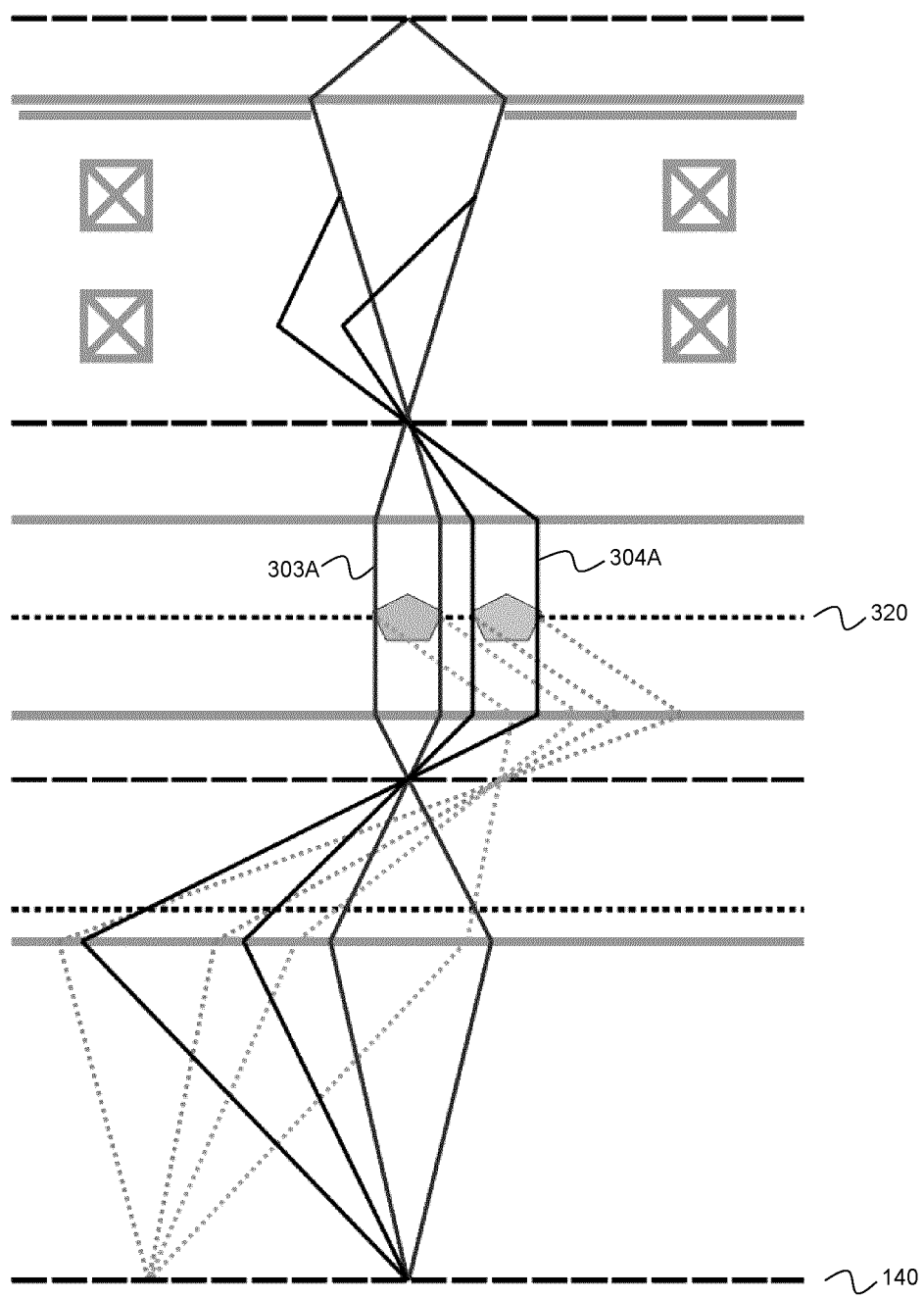
FIG. 3B shows an example of the electron beam path with the electron microscope in collimated mode for collection of diffraction patterns obtained while positioning the electron nanobeam at locations of crystals identified in the overview image.
Figure 3C:
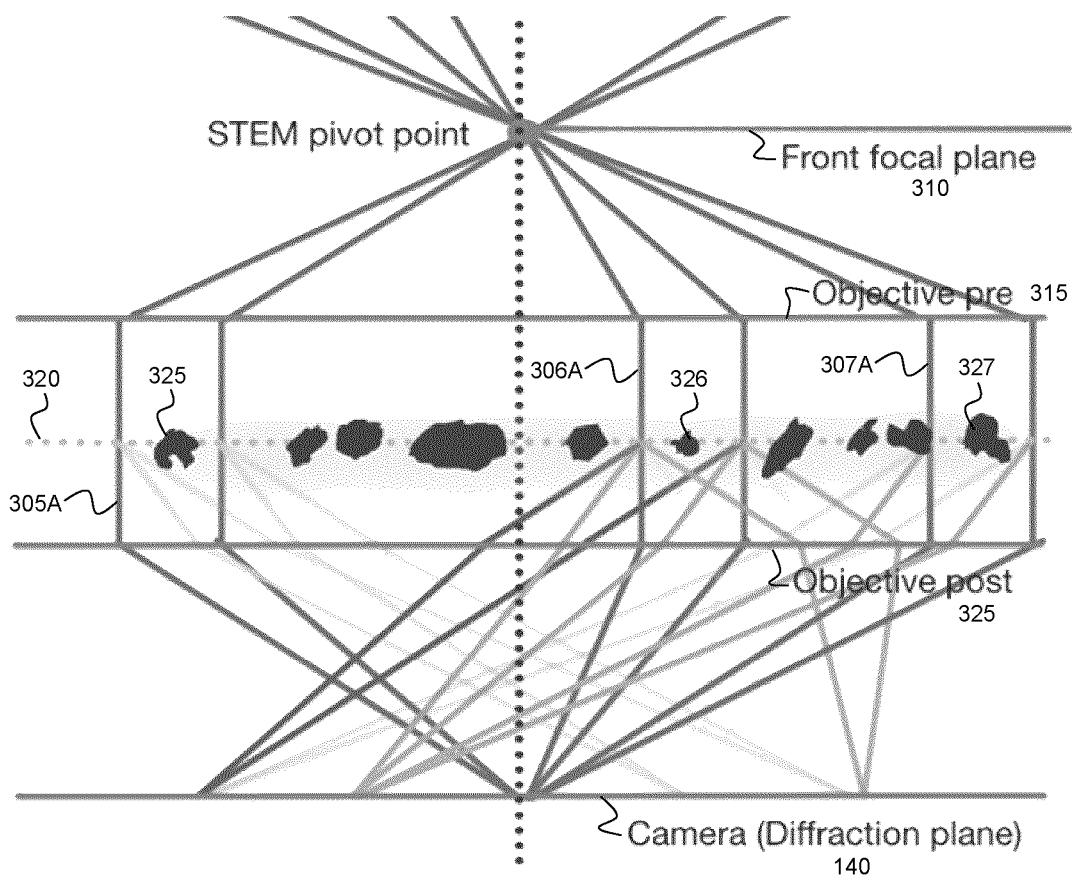
FIG. 3C shows a schematic of an example serial crystallography scheme. An electron beam is focused in the front focal plane of the objective lens, resulting in parallel illumination on the sample. The beam is then moved, hopping between previously found positions of vitrified nanocrystals, with three subsequent beam positions are shown. The diffraction from these crystals is focused by the objective lens on the camera plane.

After having determined the scanning parameters for the second scanning step, and with the detector retracted to permit access to the camera, the second scanning step may be performed, in which a collimated electron nanobeam is serially scanned among locations corresponding to the identified crystals. As shown at step 215 of FIG. 2A, this second scanning step is performed in the absence of switching from TEM mode to the scanning mode. The second scanning step is schematically illustrated in FIGS. 3B and 3C. In FIG. 3B, the ray diagram of FIG. 3A has been modified such that the electron nanobeams incident on the sample plane 303A and 304A are collimated (e.g. Kohler illumination). This modification can be achieved, for example, by changing the excitation current (and hence focal length) of the condenser lens 305. The resulting diffracted beams are detected by the camera 140.

The scanning of the electron nanobeam among the locations corresponding to the identified crystals is performed by programming the scan generator of the microscope to scan the electron nanobeam serially (sequentially), in contrast to the pixel-wise scanning method that was employed in the initial scanning step that was employed to map the sample region and generate the overview image dataset. The scanning of the collimated electron nanobeam among locations corresponding to crystals identified from the overview image dataset is further illustrated in FIG. 3C. As shown in the figure, the electron nanobeam is focused in the front focal plane 310 of the front objective lens 315, resulting in parallel illumination on the sample plane 320. The beam is then serial scanned (moved) relative to the crystals, effectively "hopping" between previously found positions of nanocrystals. In the figure, three subsequent collimated electron nanobeam positions are shown at 305A, 306A and 307A, illuminating (previously identified) nanocrystals 325, 326 and 327, respectively. The diffraction from these crystals is focused by the objective lens on the camera plane 140 for each scanning step.

The serial scanning of the electron nanobeam may be synchronized with the operation of the camera. For example, in one example implementation, serial scanning of the electron nanobeam may be synchronized with the operation of the camera such that the dwell time of the electron nanobeam at a given location matches the camera frame rate. In another example implementation, the serial scanning of the electron nanobeam may be synchronized with the operation of the camera such that the dwell time of the electron nanobeam at a given location corresponds to a multiple of the inverse of the camera frame rate, thereby facilitating the collection of multiple diffraction pattern images at the given location.

In some example embodiments, instead of collecting a single electron diffraction pattern image at each location, a video or movie can be obtained (optionally at a reduced electron beam current). Such a video permits resolution-dependent dose averaging during processing, alleviating the need for prior knowledge about the radiation sensitivity of the system under study. This example embodiment may be particularly beneficial for achieving a high level of automation and throughput, as the critical cumulative radiation dose at which resolution loss becomes significant does not need to be determined a priori: the electron diffraction pattern images employed for crystal structure determination may be selected after serial acquisition by integration of a suitable (e.g. optimized) number of video (movie) frames, discarding frames at later times (corresponding to higher dose and radiation damage) which may provide only sub-optimal diffraction. Furthermore, different integration length/doses can be employed for different steps of data analysis, improving or optimizing the trade-off between signal-to-noise ratio and resolution for each step separately.

The dose fractioning (video/movie mode) acquisition technique described above may be employed to utilize or exploit the available dose budget for a given crystal, before deterioration of the signal quality or complete loss of crystal order occurs. In a manner similar to high-speed acquisition and screening, the dose fractioning aspect of the present example embodiment can significantly reduce the need to perform characterization measurements, as well as enabling a higher level of automation, as careful observation of dose effects during acquisition is not required.

In one example implementation, the number of diffraction pattern images (and hence integrated dose) obtained for a given crystal can be chosen for the case of only a single tilt angle, such that a significant fraction of the diffraction peaks are lost after acquisition of diffraction data from the crystal is complete. It is noted that when performing such an embodiment, the electron nanobeam does not move between image frames for a given crystal and there need not be a gap between exposures (e.g. true movie mode); assuming a zero-readout-noise detector there is hence no penalty in terms of dose efficiency. A dose threshold for "complete destruction" (elimination of diffraction peaks) may be determined, for example, by performing test runs. A critical dose at which damage starts to significantly hamper data quality, but may show only subtly in raw data, may also be determined, for example, via preparation studies.

As noted above, in contrast to existing serial techniques, the tolerable dose does not have to be known a priori in the present example methods. Instead, a relatively high dose, which may even be known to be detrimental to data quality, can be used for acquisition. In later processing steps, a subset of image frames can be selected for processing, such that the dose that is effectively used for analysis is limited such that a desired level of data quality is achieved. In some example implementations, different effective doses can be employed for two or more step of the data analysis pipeline. For example, image frames may be selected such that a high (effective) dose is employed for Bragg spot indexing (orientation finding), where accurate determination of Bragg spot positions, but not intensities, is important; while in the ensuing integration step, where accurate relative intensities are determined, and which would otherwise be skewed by radiation damage, image frames are selected such that a low effective dose is employed. A suitable number of diffraction image frames to retain for a given step of the processing pipeline may be determined, for example, via experimental investigation (e.g. trial and error).

It is noted that the second scanning step differs significantly from electron beam scanning that is conventionally performed using a standard STEM instrument, as standard STEM instruments do not permit for an arbitrary scan patterns. As noted above and shown in FIG. 1, the ability to serially scan the collimated electron beam among the locations corresponding to identified crystals may be facilitated by the control, via custom hard- and software operatively connected to the scan coil current drivers (deflector current drivers), bypassing the built-in scan pattern generation entirely, with hardware-level synchronization with the camera, thereby facilitating the control over the timing of scanning and image acquisition with microsecond accuracy and minimal jitter.

Figure 3D:
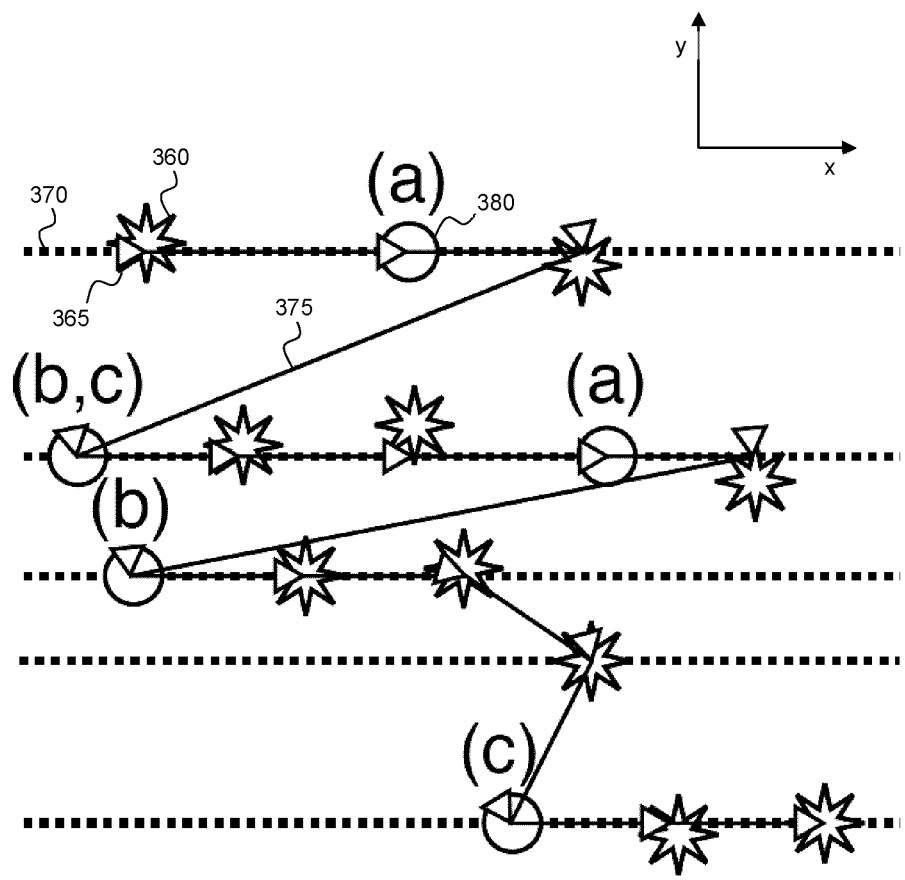
FIG. 3D shows an example method of performing scanning of the collimated electron nanobeam among previously identified nanocrystals, and the optional insertion of auxiliary scan points.

It will be understood that the second scanning step may be performed according to a wide range of scanning protocols. For example, in some example implementations, the second scanning step may be performed by scanning the electron nanobeam along a series of scanning rows that intersect identified crystal locations. An example implementation of such a scanning protocol is illustrated in FIG. 3D. The set of crystals are shown at "stars" 360 and corresponding diffraction pattern acquisition scan locations are shown at the tips of triangles 365. The path of the scanned electron nanobeam is shown by the solid line 375. As can be seen in the figure, within each row in the x direction, the beam is scanned sequentially and unidirectionally, stopping to acquire at least one diffraction pattern image at each crystal along the row.

The locations of the rows (i.e. the y-coordinates in the figure) can be determined, for example, by clustering the locations of the identified crystals (using, for example, a one-dimensional k-means algorithm) into a discrete set of scan rows, with the number of scan rows being less than the total number of scan points (locations at which diffraction pattern images are acquired), such that the identified crystals are intersected by the scan rows.

In one example implementation, the locations of the scan rows can be chosen such that the maximum deviation between the initial y-coordinate (i.e. the y-coordinate determined based on processing of the overview image) and the discretized y-coordinate (i.e. discretized to lie along a common scanning row) remains less than a given threshold. This threshold may be selected, for example, to be half the scanning beam radius. According to such an example implementation, the scan coordinates along the x (horizontal, sequential, fast-scanning) coordinates may remain unchanged relative to the values computed based on the processing of the overview image.

In some example implementations, one or more auxiliary (additional) scan points may be included during the second scanning step (i.e. additional scan locations for which diffraction data is not collected). The auxiliary scan points may be determined and inserted, for example, by the scan pattern generation algorithm in order to reduce or minimize magnetic lens hysteresis effects in the scan coils and the finite beam scan velocity, thereby maintaining accuracy of scanning among the previously determined crystal positions.

In one example implementation, auxiliary scan points may be inserted within a given scan row (e.g. in the x-direction in FIG. 3D) when the distance between successive scan points along a given scan line exceeds a given threshold, such as a distance that is sufficiently large that the electron nanobeam may not have reached its correct and stable position and tilt angle. Examples of the insertion of such auxiliary scan points are shown in FIG. 3D by the scan points marked "(a)".

An auxiliary scan point may additionally or alternatively be inserted based on transition from a previous scan row to a new scan row, (i.e. when the electron nanobeam hops from one scan line to another, as the y-coordinate is changed) when the distance, in the x-direction parallel to the scan lines, between the scan point of the previous row and the scan point after moving to the new row, is negative (e.g. in FIG. 3D, this condition is met when the first crystal of a new scan lines to the left of the last crystal in a previous scan line). Examples of the insertion of such auxiliary scan points are shown in FIG. 3D by the scan points marked "(b)".

Additionally or alternatively, an auxiliary scan point may be inserted based on transition from a previous scan row to a new scan row, when the distance, in the x-direction parallel to the scan lines, between the scan point of the previous row and the scan point after moving to the new row, is positive and exceeds a given threshold. Examples of the insertion of such auxiliary scan points are shown in FIG. 3D by the scan points marked "(c)".

The preceding conditions for the insertion of auxiliary scan points may be met for successive scan points that fail to satisfy both of the following constraints: (i) the distance, in the x-direction parallel to the scan lines, between the successive scan points, is positive, and (ii) the distance, in any direction, between the successive scan points is does not exceed a given threshold.

An auxiliary scan point may be inserted, between two successive scan points (e.g. into the list of scan points), as follows. In one example embodiment, an auxiliary scan point may be placed, between two successive scan points, at the same y coordinate as the second scan point (the latter of the two successive scan points according to the scan protocol), at an x coordinate reduced, relative to the x-coordinate of the second scan point, by prescribed amount. Example locations for the insertion of auxiliary scan points are shown in FIG. 3D by circles 380.

The distance thresholds applied for the determination of the need to include an auxiliary scan point, and the location of a given auxiliary point relative to the scan points associated with crystal locations, may be selected to be, for example, in the range of 0.1-5 microns (the lower limit may be given by the scanning beam diameter), and chosen to reduce or minimize artifacts arising from residual beam motion during recording of crystal diffraction patterns. It will be understood by the skilled artisan that the range of suitable locations for auxiliary points may be dependent on the specific microscope or electron beam system that is employed, and that for a given microscope or electron beam system, suitable thresholds and prescriptions for locating the auxiliary points may be determined via experimentation, e.g. by scanning the electron beam and determining thresholds and auxiliary point locations that sufficiently reduce or minimize artifacts. The scanning dwell time on this auxiliary point need not be equal to the scanning dwell time used for the actual points corresponding to crystals. At the auxiliary points, either no diffraction data is recorded, or diffraction data is recorded and discarded in later processing steps.

In some example implementations, an automated calibration routine may be employed to compensate offsets in scan positions between scanning during overview image dataset collection and scanning during diffraction acquisition. For example, in the aforementioned scanning configuration, in which hysteresis and limited beam velocity effects affect the x-direction only, calibration may be performed by taking a STEM image of a narrow (along y) rectangular stripe over the full x-width of the image, at a slow scan rate (of the order of 10 nm/ms), followed by an identical image acquired at the scan rate of the overview image (typically rather 1 μm/ms). The offset between both can be found to nanometer precision using a simple cross-correlation, and accurately represents the offset between overview and diffraction acquisition. It has been found that this shift depends on the scan parameters and field of view of the overview image (which are seldom changed within one session), and is otherwise extremely stable, such that this calibration has to be done only infrequently.

After having interrogated a given sample region, an additional sample region may be identified, and the method described above may be repeated to collect a new set of electron diffraction patterns. Optionally, this step can easily be scripted in a tiling scheme, to allow for fully unsupervised acquisition of large sample area.

The resulting electron diffraction pattern images may be post-processed (i.e. processed after completing the second scanning step, as shown at 220 in FIG. 2A. Alternatively, if sufficient computing resources are available, the electron diffraction images may be, at least in part, pre-processed (e.g. peak finding, unit-cell determination) during the second scanning step (e.g. while performing step 215 in FIG. 2A; in real time).

The electron diffraction pattern images may be processed, for example, according to the following non-limiting example workflow, which is described further in the Examples section provided below. In some example implementations, pre-processing of the electron diffraction pattern images may be performed, where electron diffraction pattern images are post-selected using automated routines in which the per-shot beam center (which may slightly change within a scan) is found and the incoherent scattering background is determined. Optionally, extraction of diffraction peak positions and intensities can be performed during pre-processing, for example using application-specific methods, as shown, for example, in FIGS. 7A, 8A and 9A (e.g. as described in Barty et al. 2014. "Cheetah: Software for High-Throughput Reduction and Analysis of Serial Femtosecond X-Ray Diffraction Data." Journal of Applied Crystallography 47 (3). International Union of Crystallography: 1118-31. doi:10.1107/51600576714007626). The diffraction data may then be converted into a format suitable for further processing. The amount of acquired diffraction data may be in the Terabytes range, which may be analyzed within larger-than-memory frameworks (for example, using the dask package within the Python scientific stack).

Peak indexing and integration may be performed using adaptation of known algorithms for X-ray crystallography and such modifications will be readily apparent to the skilled artisan (for example, as taught in Nannenga et al. 2016, "MicroED Opens a New Era for Biological Structure Determination." Current Opinion in Structural Biology 40 (October). Elsevier Ltd: 128-35. doi:10.1016/j.sbi.2016.09.007 and in Clabbers et al. 2017. "Protein Structure Determination by Electron Diffraction Using a Single Three-Dimensional Nanocrystal." Acta Crystallographica Section D Structural Biology 73 (9). International Union of Crystallography: 738-48. doi:10.1107/52059798317010348). Algorithms such as nXDS (Kabsch 2014, "Processing of X-Ray Snapshots from Crystals in Random Orientations." Acta Crystallographica Section D: Biological Crystallography 70 (8). International Union of Crystallography: 2204-16. doi: 10.1107/51399047714013534), CrystFEL (White et al. 2012, "CrystFEL: A Software Suite for Snapshot Serial Crystallography." Journal of Applied Crystallography 45 (2): 335-41. doi:10.1107/S0021889812002312; White et al. 2016, "Recent Developments in CrystFEL." Journal of Applied Crystallography 49. International Union of Crystallography: 680-89. doi:10.1107/S1600576716004751) and DIALS (Winter et al. 2018, "DIALS: Implementation and Evaluation of a New Integration Package." Acta Crystallographica Section D: Structural Biology 74. International Union of Crystallography: 85-97. doi:10.1107/ S2059798317017235) may be employed for processing serial electron crystallography data.

Structure refinement from integrated reflections may also be performed. For example, known protocols from X-ray crystallography processing can be adapted using programs of the Phenix (Adams et al. 2010, "PHENIX: A Comprehensive Python-Based System for Macromolecular Structure Solution." Acta Crystallographica Section D: Biological Crystallography 66 (2): 213-21. doi:10.1107/ 50907444909052925) or CCP4 (Winn et al. 2011, "Overview of the CCP4 Suite and Current Developments." Acta Crystallographica Section D: Biological Crystallography 67 (4). International Union of Crystallography: 235-42. doi: 10.1107/50907444910045749) software suites. The ability to provide the crystal shape from STEM images (see, for example, FIGS. 7B, 8B and 9B) may also enable straightforward use of direct iterative phasing, or even application of single-particle coherent diffractive imaging methods (see, for example, Zuo et al. 2011, "Combining Real and Reciprocal Space Information for Aberration Free Coherent Electron Diffractive Imaging." Ultramicroscopy 111 (7). Elsevier: 817-23. doi:10.1016/j.ultramic.2010.10.013 and Ran et al. 2012, "Electrons for Single Molecule Diffraction and Imaging." Ultramicroscopy 119. Elsevier: 72-77. doi: 10.1016/j.ultramic.2011.11.007).

In some example embodiments, the preceding example method may be adapted to perform a tilt series. For example, referring to FIG. 2A, the dark field detector may be re-inserted and steps 200-215 may be performed after rotating the sample stage to a new tilt angle. This sequence may be performed one or more additional times to collect electron diffraction pattern images for additional tilt angles. The present example tilt series technique may be especially powerful when employed for the detection of crystals of unknown lattice structure, for which the orientation of which would be difficult to determine based on a single uncorrelated orientation. In some cases, the indexing of each crystal from a single tilt angle can be difficult. As unindexed crystals are generally not useful (and can even be detrimental) for the merged data set, a significantly increased fraction of successfully indexed crystals will concomitantly lead to less sample consumption.

Figure 2B:
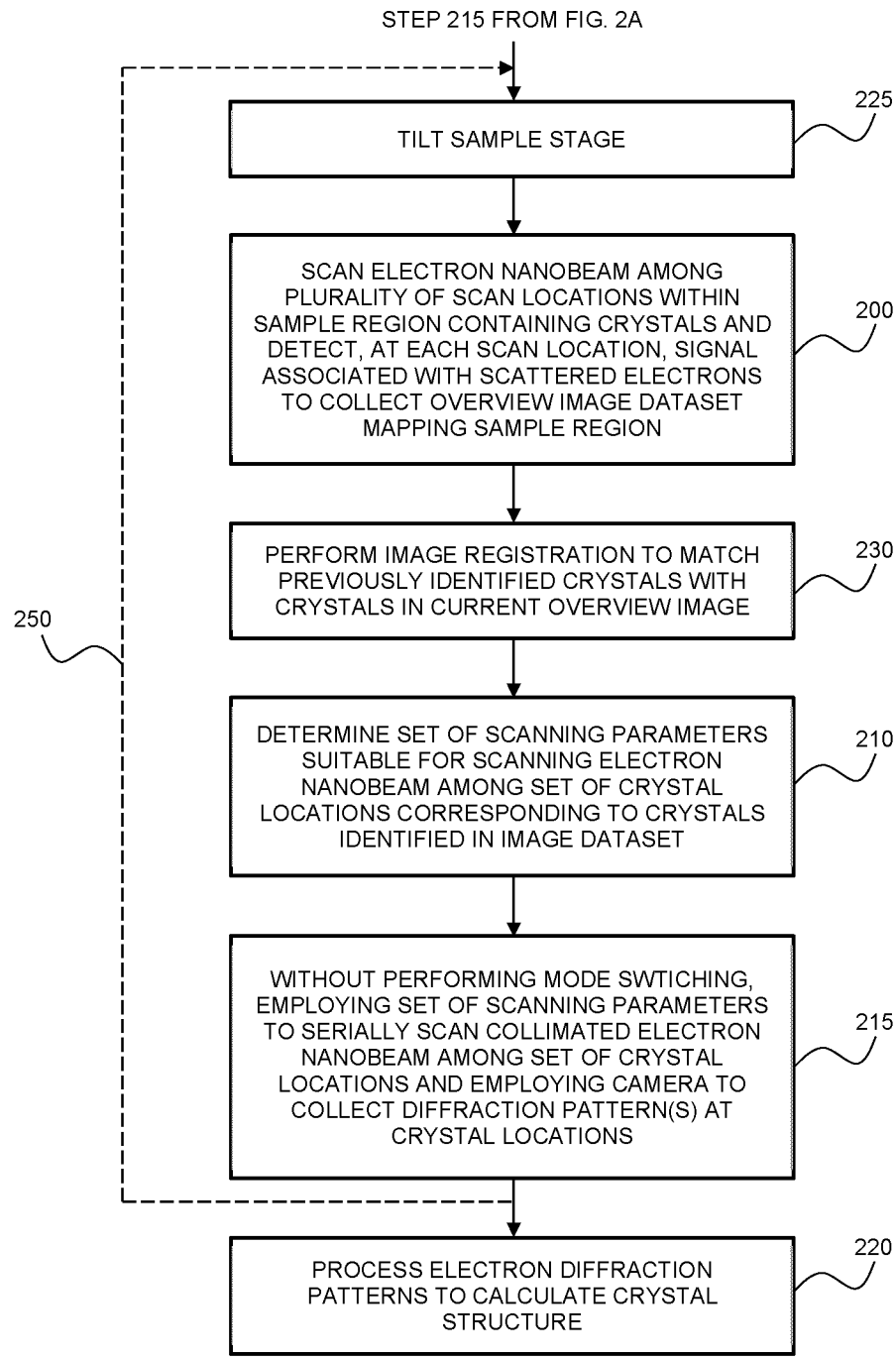
FIG. 2B is a flow chart illustrating an example method of performing serial electron diffraction nanocrystallography in which a tilt series is collected.

In one example embodiment, as illustrated in the flow chart shown in FIG. 2B, image registration may be employed to determine a coordinate transformation for determining the locations of the crystals that were identified in an overview image dataset obtained at an initial (or previous) tilt angle. For example, image registration may be performed using an enhanced correlation coefficient (ECC) method [Georgios D. Evangelidis and Emmanouil Z. Psarakis, IEEE TRANSACTIONS ON PATTERN ANALYSIS AND MACHINE INTELLIGENCE, VOL. 30, NO. 10, October 2008, 10.1109/TPAMI.2008.113] applied to the mass thickness intensity data robustly yields a suitable affine coordinate transform. As shown in the flow chart, after collecting electron diffraction pattern images at a previous tilt angle (e.g. as per the method in FIG. 2A), the sample stage is tilted, as shown at 225, and a current overview image dataset is collected, as shown at step 200. The current overview image dataset may optionally be collected using a collimated electron nanobeam, thereby avoiding the need for re-focusing the beam. The current overview image dataset is then registered to a previous overview image dataset (or vice versa) to obtain a coordinate transformation. The coordinate transformation is employed to determine the locations of previously identified crystals in the current coordinate system. Steps 210 and 215 may then be performed, as in FIG. 2A. As shown at 250, this sequence may be performed one or more additional times to collect electron diffraction pattern images for additional tilt angles.

It will be understood that while the initial scanning (mapping) step provides crystal identification and location determination for the subsequent diffraction data acquisition scanning step, it may also serve to increase the ease and robustness of subsequent data analysis that involves the synthesizing of a merged data set from the thousands of crystal diffraction images. Firstly, the total detected signal may be quantitatively related to the local sample thickness, allowing for proper normalization of signal strength, and estimation of the likelihood of dynamical scattering artifacts (e.g. the thickness may be derived for a given crystal each crystal along the beam direction based on the total amount of scattered electrons, and the resulting thickness information may be employed to take into account effects of multiple electron scattering during crystal structure determination). Secondly, the overview image may be processed to determine crystal morphology (facets), which can be employed to provide a strong restriction of the search space of crystal orientations to be determined in the indexing step. Either of these two priors may thus be employed to achieve a higher quality of the merged data set at a given number of recorded crystals.

In some example embodiments, one or more additional reference overview image datasets may be collected in addition to the overview image dataset that is employed for crystal identification and localization. In one example embodiment, an additional reference overview image dataset may be obtained with the electron nanobeam in a collimated (parallel) configuration (as in configuration illustrated in FIG. 3B). It is noted that as even moderately long STEM dwell times (few μs) are short with respect to the diffraction image exposure times (which depend on the camera and may be on the scale of milliseconds), the electron dose delivered to the sample in this additional step is negligible. The initial (focused) overview image dataset may be compared (e.g. via cross-correlation) to the additional reference (collimated) overview image dataset to determine whether or not a position mismatch is present. In the event of the determination of a position mismatch between the focused and defocused overview image dataset, the coordinates of the crystals determined from the processing of the initial overview image dataset may be shifted accordingly.

In some example embodiments, the initial scanning step may be performed using a collimated beam instead of a focused beam. For example, in an example case in which a collimated electron nanobeam has a diameter that is smaller than the crystals (such as measured 100-400 nm lysozyme crystals), a parallel beam may provide sufficient resolution for crystal identification and location determination based on the overview image dataset. On the other hand, when working with even smaller samples (such as metal-organic frameworks of tens of nanometers size only), focusing may be required in order to obtain sufficient resolution for crystal mapping.

By changing the settings of the electron gun (spot size, gun lens, extraction voltage), the beam current may be selected according to one or more constraints associated with a net electron dose delivered to a given nanocrystal. For example, the beam current may be controlled such that it satisfies the constrain $I=eDf\cdot\pi(d/2)^2/K$, where d is the beam diameter, f is the camera frame rate, D is the desired dose, K is the number of tilt angles K (if a tilt series is taken, otherwise K=1), and e denotes the elementary charge.

In some example embodiments, the combination of the collection of the overview image dataset and a custom scan pattern for diffraction image collection may provide the option to fractionate the maximum radiation dose (fluence) between a discrete set of sample tilts, while maintaining the unique identification of each crystal (e.g. using the image registration method described above). This capability may be important for accurate indexing and merging of diffraction patterns, especially for the case of crystals with unknown lattice parameters. In one example implementation, this may be achieved as follows: first, a full data set (overview image dataset and diffraction images) of crystals within a current field of view (sample region) is obtained at a first (e.g. zero) tilt, with a reduced integrated dose (e.g. the dose may be restricted according to criteria selected avoid an amount of damage that would otherwise prohibit acquisition of diffraction patterns in subsequent runs at different tilt angles). Secondly, the sample stage is tilted, and another overview image is taken. As explained above, instead of independently finding crystals in the tilted overview image, which would prohibit later unique assignment of tilted to untilted diffraction patterns, the image itself may act as a fiducial to precisely determine the affine transform between the tilted and initial scan positions. Finally, the tilted diffraction set is recorded using these transformed positions.

In some example embodiments, the tilt-pair technique, where two diffraction patterns are taken for each crystal at a known difference of tilt angle, can serve to enable high-accuracy indexing in cases where a single diffraction pattern is insufficient, e.g. if lattice parameters are yet unknown. As one of the tilt pair images is exclusively used for indexing, but no Bragg spot intensities in it are used, it can be combined with the dose fractioning technique.

The example embodiments described herein may provide several benefits and advantages relative to previous methods of performing nanocrystallography. In contrast to previous methods that employ X-rays, electron beams advantageously afford a significantly higher ratio between favorable elastic scattering events and amount of undesired energy deposition (Henderson, R. The potential and limitations of neutrons, electrons and X-rays for atomic resolution microscopy of unstained biological molecules. Q. Rev. Biophys. 28, 171-193 (1995)) and can be shaped and moved much more easily and rapidly than X-rays. Electron beams also provide a more favorable ratio of elastically scattered signal electrons to deposited energy due to inelastic scattering, which significantly raises the amount of collected information per crystal. Furthermore, real-space imaging techniques, as employed during the initial (crystal mapping) scanning step of the present disclosure are much more readily available, essentially solving the sample delivery problem by in-situ mapping of a fixed-target sample with randomly distributed crystals. The serial electron crystallography approach employed according to the present example methods is also beneficial in that, instead of acquiring data from a single or a few crystals at various rotation angles, the final data set is computationally merged from a very large number of crystals, each recorded at random orientation, inherently avoiding the issue of cumulative radiation damage in a rotation series. Consequently, smaller crystals, each of which is destroyed in the single measurement process, can be used, which are often easier to grow. This feature also greatly reduces the amount of precious material needed for structure determination, which will be a very significant determining factor in many applications.

Due to its increased level of automation, the present example embodiments can significantly increase throughput relative to known Micro-ED methods, while at the same time easing the time and skill requirements for the laborious manual work of identifying suitable crystals with a very limited radiation dose budget, and carefully taking the rotation series while keeping the crystal within the field of view. The present two-step crystal detection and diffraction pattern collection scanning protocol rapidly can be employed to collect diffraction shots of a vast number of crystals; accepting the inclusion of false positives and poorly diffracting or too thick crystals, which can easily be excluded in post-processing using readily available information from the overview images, as well as the diffraction patterns themselves.

The present example embodiments also beneficially permit the suppression of background via the collimated nanobeam configuration. Indeed, instead of using a large, parallel "flood" beam and selecting the crystal under study using a post-specimen aperture in a conjugate image plane (as in previous methods), the present example methods may employ a collimated nanobeam of lateral dimensions similar to those of the identified crystals when serially collecting electron diffraction patterns. As a consequence, background caused by scattering from substrate and vitreous ice around the crystal is reduced or minimized, while collateral radiation damage to potentially useful crystals in the vicinity to the crystal under study is avoided.

A significant advantage of the present example methods is achieved by avoiding the need to switch from TEM mode to scanning mode when collecting electron diffraction image patterns. Mode shifting between flood-beam TEM and nanobeam diffraction requires focusing of the beam using the condenser lens, as switching to a smaller condenser aperture cannot be achieved with sufficient accuracy to keep the mapping of crystal positions intact. This implies a large convergence angle in the milliradian-range when mode switching is performed—even larger than for known scanning nanobeam diffraction schemes (e.g. Gallagher-Jones et al. 2019, "Nanoscale mosaicity reveaked in peptide microcrystals by scanning electron nanodiffraction." Communications Biology 2, 26). The mandatory consequence of mode switching is thus an overlap of Bragg reflections in large-unit-cell crystals in the diffraction plane, prohibiting the use of standard crystallographic data analysis. In stark contrast, the example methods described herein perform crystal mapping in scanning mode, which inherently keeps the detector plane conjugate to the diffraction pattern at all times and can be done with a small condenser aperture. Mode-switching from TEM is not required, absent from a small and uncritical change in condenser current. Indeed, due to the small condenser aperture used during the acquisition of the overview image dataset, a collimated (e.g. 100 nm diameter) beam may be generated in a straightforward manner.

The present example methods also offer significant potential benefits relative to known TEM-mapping schemes, such as the method disclosed by S. Smeets et al., "Serial electron crystallography for structure determination and phase analysis of nanocrystalline materials," J. Appl. Crystallogr., vol. 51, no. 5, pp. 1-12, 2018.). Besides the complex mode-switching sequence involved in TEM-mapping, the software-controlled beam motion and detector synchronization required for the TEM-mapping scheme restricts the acquisition rate to approximately 1 Hertz (independent of detector speed), which is insufficient for high-throughput serial acquisition as needed for more complex crystals. In contrast, the rate achievable according to the present example methods is primarily limited by detector readout, which can readily provide an increase in acquisition rate of several orders of magnitude relative to TEM-mapping approaches. Moreover, in the TEM-mapping approach, the advantage of higher automation and lower operational complexity in serial acquisition with respect to micro-ED is compromised by the sophisticated calibration procedures, as well as high stability requirements of the instrument. In contrast, due to the high speed and much lower complexity of the present example methods, even instruments with relatively poor stability can readily be used.

Various aspects of the present example embodiments may serve to increase the speed and/or throughput of data acquisition with respect to conventional nanocrystallography techniques. Even before inserting the sample into the electron microscope, the relatively modest requirements for sample quality—afforded by the inherently integrated screening step, and the small acquisition time penalty for inclusion of crystals of uncertain quality, and the general advantage of the serial acquisition approach over single crystal acquisition methods, may save a significant amount of laborious work with respect to conventional techniques. Indeed, once the measurement commences according to the present example embodiments, the advantage of high speed and extensive automation is facilitated by the increased number of diffraction patterns that can be acquired in a given amount of time, which can be precious especially for frozen samples, where in all but the most high-end microscopes a slow ice buildup process constantly contaminates the sample.

One aspect of the present example embodiments that enables high speed is the efficiency of the present serial scanning method, which allows for fast (e.g. micro-to millisecond scale—which appears to be primarily limited by achievable beam current and camera speed), tightly hardware-timed translation of the beam to precisely known positions solely defined by known, discrete deflector current settings, which lies in stark contrast to existing schemes, which are mired with slow (second-scale) software-based timing, more indirect mapping (e.g. requiring pixel size and beam shift calibrations) and imprecise beam motion due to intermittent mode changes.

The hardware-timed and (up to slight corrections) calibration-free mapping/acquisition scanning approach of the present example methods enable a precise and effective means to exhaustively use the available sample for data collection, while keeping total acquisition time close to the lower limit defined by the electron beam brightness. The measurement sequence described above allows for a high level of robust automation and unsupervised data collection, with a lower required skill level of operators than rotation electron crystallography techniques. Apart from the generally relaxed requirements for sample quality, the scanning-based mapping approach allows to inherently screen samples for favorable crystal and overall sample properties (such as crystal density on the grid), instead of the additional screening steps required, for example, for X-ray crystallography. All these factors may serve to increase the net throughput of samples, which is an essential advantage to establish the technique in the competitive environment of structural biology.

In general, for a given number of crystals to measure, the required acquisition time is determined by factors including the camera frame rate, the minimum exposure time (if limited by beam current), the number of tilts, and the crystal density on the grid (which may determine the required number of crystal search iterations). The present example methods that employ serial scanning thus facilitate the collection of a large amount of degenerate diffraction data, enabling the efficient solving of crystal structures, which can potentially reduce the time required to solve crystal structures by orders of magnitude.

Although the example embodiments presented above describe the use of a modified STEM instrument (i.e. a STEM instrument modified to perform the serial scanning method to position a collimated electron nanobeam among crystals identified via an overview image dataset), it will be understood that the present disclosure is not intended to be limited to such an implementation. In alternative embodiments, an instrument other than a STEM instrument may be employed to practice the methods described herein. For example, a custom or dedicated instrument, other than a commercial STEM instrument, may be employed to perform the methods illustrated in FIGS. 2A and 2B, and variations thereof.

In some example embodiments, a system for performing the dual scanning protocol described above is capable of providing a pulsed or continuous beam of electrons at hundreds of keV of energy (e.g. via a field emission gun). The beam diameter of the collimated electron nanobeam at the sample plane lies in the sub-micron range (e.g. ranging between 10 nm and 1000 nm). The angular divergence of the collimated electron nanobeam may be selected based on the system that is under study. For example, in the case of a small protein with a 10 nm unit cell size and 200 kV electrons, the angular divergence may be less than 0.1 mrad, whereas for even smaller systems, even larger divergence angles (following a reciprocal dependency) may be viable. It will be understood that the beam current determines the acquisition throughput, and for example parameters of a beam diameter of 100 nm, a dose of 1000 electrons per square nanometer, and an exposure time per crystal of 1 ms, an average current of the order of 1 nA is employed. It will be understood that the electron dose may depend on the system under study. In some example implementations, the beam is scanned over a sample region having a size of tens of microns (e.g. 10-100 microns) at high speed (e.g. with the beam being scanned from one position to another with a time duration of less than 20 microseconds) and with nanometer precision (e.g. a precision smaller than the size of the crystals, such as a precision less than 10 nm).

Although some of the example embodiments provided above refer to the use of deflectors to actively scan the electron nanobeam relative to the sample, it will be understood that the electron nanobeam may alternatively be scanned relative to the sample such that the sample is actively translated relative to a fixed electron nanobeam (for example, using piezoelectric stages, with positioning accuracy, for example, better than 10 nanometers at motion speeds of at least tens of nanometers per microsecond). For example, a diffractometer system with fast and closed-loop piezo stages may be employed. A potential advantage of such a configuration is the spatially fixed interaction point between beam and sample, potentially facilitating time-resolved measurements using external triggers. The piezo stages could be operated at a high speed (e.g. at least 10 nanometers per microsecond) continuously (open-loop) during the mapping step, recording the correlation between the stage encoder signals and a signal derived from the transmitted electron beam, to reconstruct the mapping image in stage-encoder coordinates (similar to the scanning beam scheme described above, a calibration to real-world coordinates is not mandatory). For acquisition, the crystals can then be addressed by operating the stages in closed-loop mode. A combination with beam pulsing using fast blanking or a natively pulsed electron source could be employed to mitigate collateral irradiation during the relatively slow closed-loop motion.

The overview image dataset described above may be collected sequentially while scanning the electron nanobeam using a fast single-channel detector (e.g. a detector with a bandwidth in the range of 100 kHz to 1 MHz, or exceeding 1 MHz) that provides a summed signal defined by the electrons scattered by the sample to more than a given minimum angle (annular dark field detector) is required for acquisition of overview images. The electron diffraction pattern images may be collected using a high frame-rate electron camera placed in the far field of the sample (typically at effective camera lengths of approximately 1 m), which can be synchronized to the beam/stage scanning.

In some example implementations, the camera may have a frame rate of at least 50 fps. In other example implementations, the camera frame rate may exceed 100 fps, 200 fps, 500 fps, or 1000 fps. It will be understood that the frame rate will generally depend on the electron beam current, as higher beam currents may necessitate a higher frame rate in order provide a dose that is suitable. For non-video mode acquisition of electron diffraction pattern images, the frame rate may be selected, for example, to exceed 50 fps. For example, a non-video mode single exposure (per crystal) of 10-20 ms may necessitate a reduction of beam current from the maximum beam current deliverable by an electron microscope system, in order to avoid damaging the crystal. On the other hand, in the case of video-mode acquisition, a frame rate exceeding 500 Hz, such as a frame rate in the 1-3 kHz range, may be desirable for capturing a series images for a given crystal, with the dose per individual image being sufficiently low to avoid damage, while optionally delivering a net dose that is sufficient to cause damage (and the loss of the diffraction patterns), permitting the selection of a subset of suitable images for processing.

The camera should be sufficiently radiation-hard to record diffraction patterns, preferably including the central transmitted beam. While a hybrid pixel detector may be employed, indirect detectors based on CMOS sensors may also be used in the alternative.

If the acquisition of tilt series (diffraction tomography) is desired, the sample stage is provided that is capable of rotation perpendicular to the electron beam axis, while maintaining the sample region in the beam range (eucentric tilt).

Figure 4:
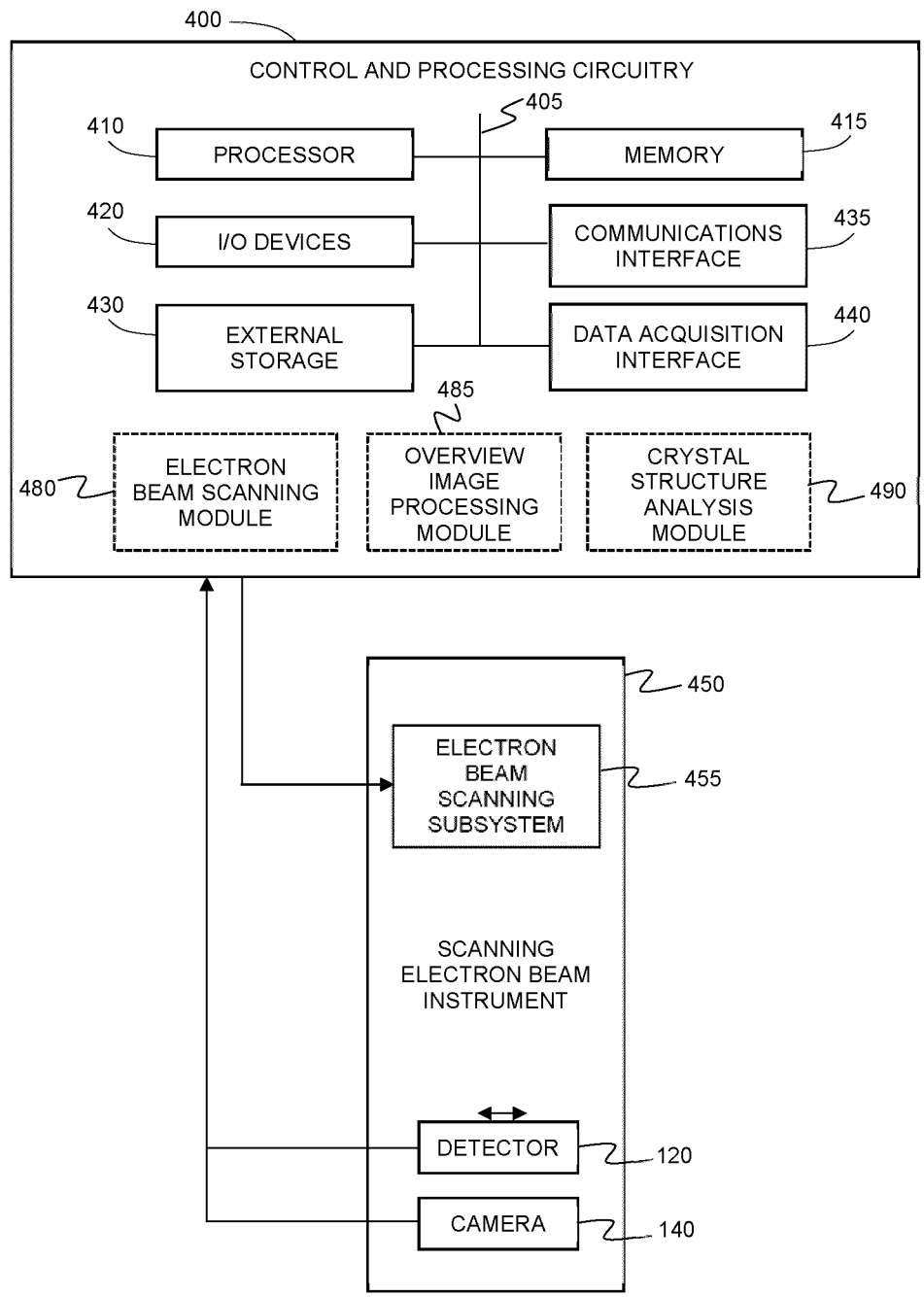
FIG. 4 shows a schematic of an example implementation in which a commercial STEM system is adapted for performing serial electron diffraction nanocrystallography.

An example system for performing serial electron diffraction nanocrystallography is shown in FIG. 4. The example serial electron diffraction nanocrystallography system includes a scanning electron beam instrument 450, which may be a modified STEM instrument or a non-STEM instrument that is capable of performing the methods described herein. The scanning electron beam instrument 450 includes an electron beam source and focusing electron optics (not shown), an electron beam scanning subsystem 455 for scanning the electron beam relative to a sample (e.g. beam deflectors for actively scanning the electron beam or a piezoelectric stage for translating the sample relative to a stationary electron beam), a detector 120 for collecting an overview image dataset during an initial scanning step, and a camera 140 for collecting electron diffraction images (from crystals identified from the overview image dataset) during the second scanning step.

The electron beam scanning subsystem 455, the detector 120 and the camera 140 are operatively coupled to control and processing circuitry 400. As shown in the example embodiment illustrated in FIG. 4, the control and processing circuitry 400 may include a processor 410, a memory 415, a system bus 405, one or more input/output devices 420, and a plurality of optional additional devices such as communications interface 435, external storage 430, and data acquisition interface 440. In one example implementation, a display (not shown) may be employed to provide a user interface for displaying a user interface, and may further display data such as images of crystals, electron diffraction patterns, and results from crystal structure analyses.

The example methods described above can be implemented via processor 410 and/or memory 415. As shown in FIG. 4, executable instructions represented as electron beam scanning module 480, overview image processing module 485 and crystal structure analysis module 490 (and optionally an image registration module for use in tilt series acquisition) are processed by control and processing circuitry 400 to control the scanning electron beam instrument 450 and process data obtained therefrom. The control and processing circuitry 400 may include, for example, and execute instructions for performing one or more of the methods illustrated in FIGS. 2A-2B, or other methods described herein, or variants thereof. Such executable instructions may be stored, for example, in the memory 415 and/or other internal storage.

The methods described herein can be partially implemented via hardware logic in processor 410 and partially using the instructions stored in memory 415. Some embodiments may be implemented using processor 410 without additional instructions stored in memory 415. Some embodiments are implemented using the instructions stored in memory 415 for execution by one or more microprocessors. Thus, the disclosure is not limited to a specific configuration of hardware and/or software.

It is to be understood that the example system shown in the figure is not intended to be limited to the components that may be employed in a given implementation. For example, the system may include one or more additional processors. Furthermore, one or more components of control and processing circuitry 400 may be provided as an external component that is interfaced to a processing device. Furthermore, although the bus 405 is depicted as a single connection between all of the components, it will be appreciated that the bus 405 may represent one or more circuits, devices or communication channels which link two or more of the components. For example, the bus 405 may include a motherboard. The control and processing circuitry 400 may include many more or less components than those shown. In some example implementations, some aspects of the data processing may be performed using an additional external computing system, such as the processing of the electron diffraction pattern images for the determination of crystal structure.

Some aspects of the present disclosure can be embodied, at least in part, in software, which, when executed on a computing system, transforms an otherwise generic computing system into a specialty-purpose computing system that is capable of performing the methods disclosed herein, or variations thereof. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine-readable media, such as discrete hardware components as large-scale integrated circuits (LSI's), application-specific integrated circuits (ASIC's), or firmware such as electrically erasable programmable read-only memory (EEPROM's) and field-programmable gate arrays (FPGAs).

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

EXAMPLES

The following examples are presented to enable those skilled in the art to understand and to practice embodiments of the present disclosure. They should not be considered as a limitation on the scope of the disclosure, but merely as being illustrative and representative thereof.

The methods described in above scheme have successfully been implemented at a Thermo Fisher Tecnai F20 S/TEM, equipped with a X-Spetrum Lambda hybrid pixel detector, a custom STEM control/acquisition system based on National Instruments data acquisition hardware, and custom control and real-time acquisition programs implemented in the Python and National LabVIEW programming languages. Results of such measurements are shown in FIGS. 5 to 9. With the exception of FIG. 5B and FIGS. 6A-6E, all figures show data from vitrified protein nanocrystals of Lysozyme, prepared by fragmenting larger microcrystals using metal beads, similar to the procedure described in: M. J. de la Cruz et al., "Atomic-resolution structures from fragmented protein crystals with the cryoEM method MicroED," Nat. Methods 14 (2017), 399.

Figure 5A:
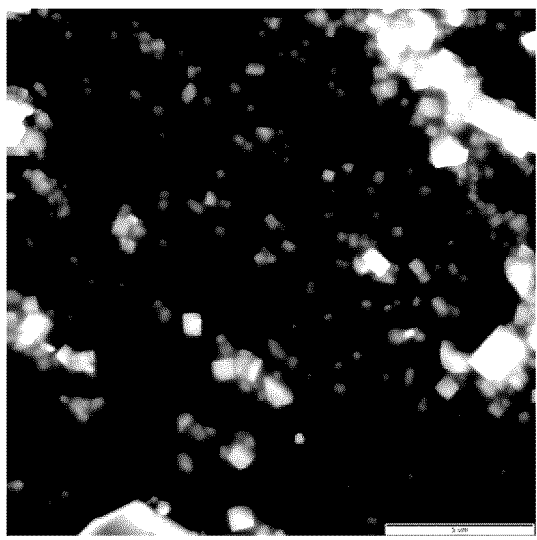
FIGS. 5A and 5B show overview images of regions chosen for serial crystallography acquisition from different systems: Lysozyme at vitrified conditions (FIG. 5A), and DUT-8 metal-organic frameworks at room temperature (FIG. 5B). These two systems are representative for a wide class of possible applications in structural biology and chemistry, respectively.
Figure 5B:
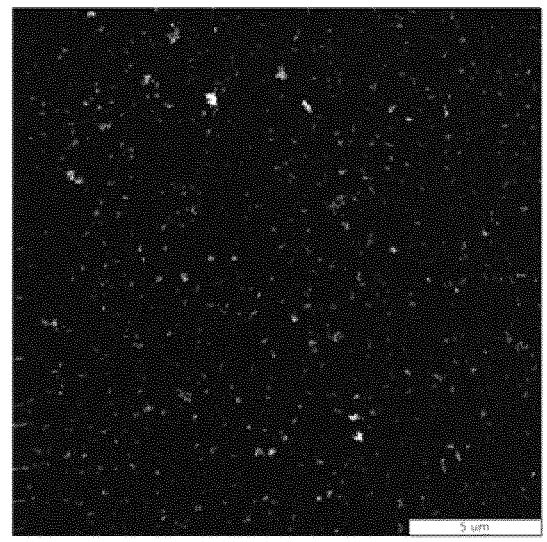
Figure 6A:
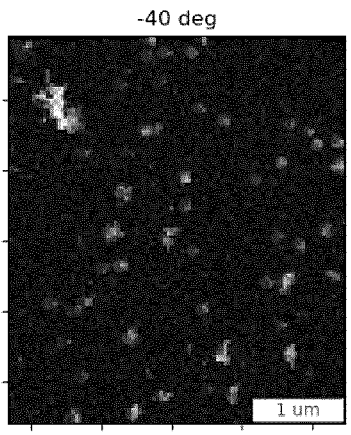
FIGS. 6A-6E show the labeling of images of crystalline metal-organic frameworks (DUT-8), taken at different tilt angles, where the dots represent the found crystal positions. Note that the unique identification of each crystal persists between the tilt angles, despite shift and scale transformations.
Figure 6B:
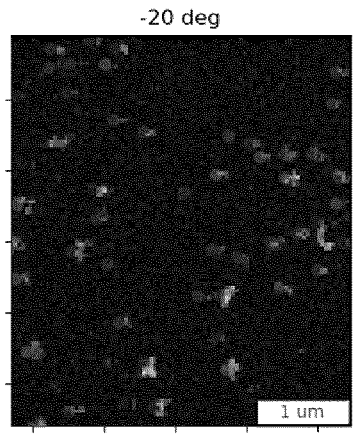
Figure 6C:
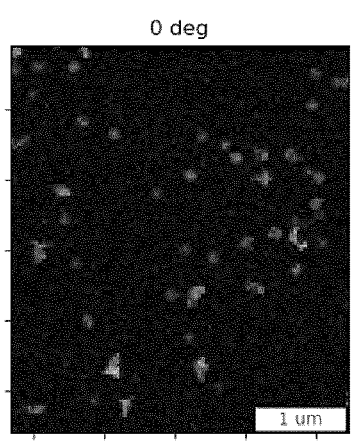
Figure 6D:
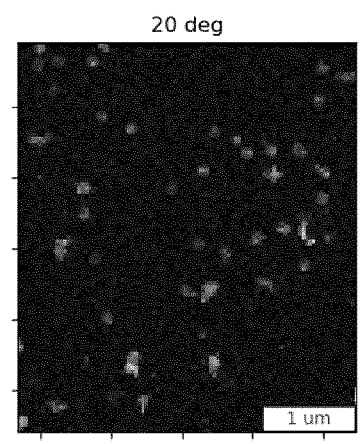
Figure 6E:
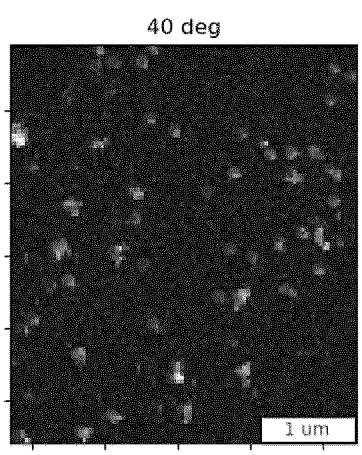

FIG. 5A shows the STEM mapping image of a typical sample region chosen for diffraction data collection. Nanocrystals are clearly visible as bright, faceted features. FIGS. 7-9 show data obtained from this sample. As a representative of a different sample class, FIG. 5B shows a similarly sized sample region, containing metal-organic frameworks of type DUT-8 ([1] V. Bon, N. Klein, I. Senkovska, A. Heerwig, J. Getzschmann, D. Wallacher, I. Zizak, M. Brzhezinskaya, U. Mueller, and S. Kaskel, "Exceptional adsorption-induced cluster and network deformation in the flexible metal-organic framework DUT-8(Ni) observed by in situ X-ray diffraction and EXAFS," Phys. Chem. Chem. Phys. 17 (2015), 17471.) at room temperature, representative for a different class of samples.

FIGS. 6A-6E shows a series of STEM mapping images obtained from the same sample as shown in FIG. 5B. All panels A-E show the same region, at different stage tilt angles as indicated in the panel titles. The colored markers indicate the found position of the crystals; the marker color of each crystal remains fixed between panels A-E. Note that despite the different projection angles and image shifts at different stage tilts, the unique identification of each crystal remains intact. This is achieved by enhanced correlation coefficient registration applied to the images, in order to obtain crystal coordinate transforms.

Figure 7A:
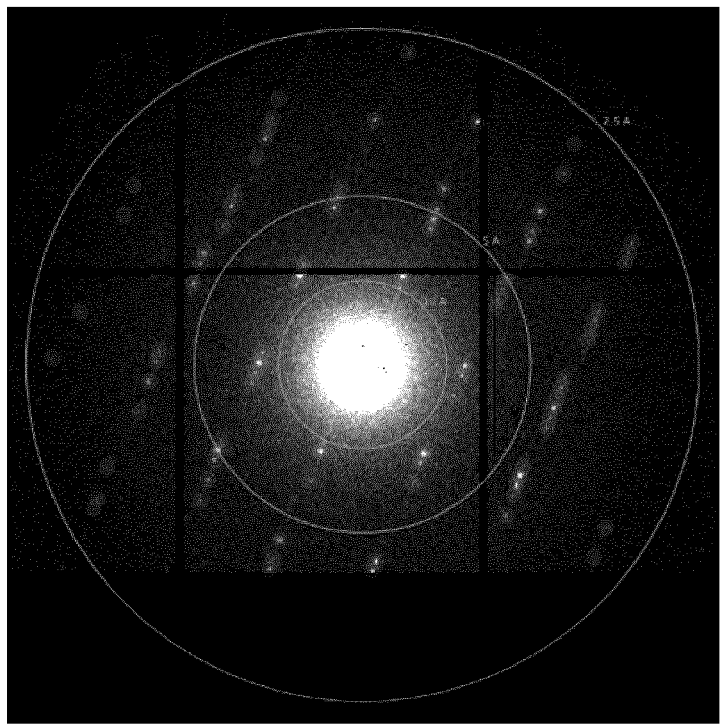
Figure 7B:
Figure 7C:
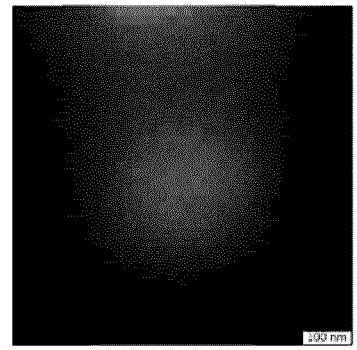

FIG. 7A shows a representative diffraction pattern obtained from a single Lysozyme crystal. Note that no background subtraction has been applied. The markers indicate found Bragg spot positions through applying the peakfinder8 algorithm (A. Barty et al. "Cheetah: software for high-throughput reduction and analysis of serial femtosecond X-ray diffraction data." J. Appl. Crystallogr. 47, 1118-1131, 2014). FIG. 7B shows the mapping STEM image of the sample region containing the crystal yielding the diffraction pattern in FIG. 7A. This crystal is indicated by a central dot. FIG. 7C shows a close-up of the region in the mapping image around this crystal. The size of the red dot is indicative of the approximate actual beam size.

FIGS. 8A-8C and 9A-9C show results analogous to those presented in FIG. 7.

Additional example of methods of performing analysis of the recorded diffraction patterns are provided in the following sections.

Data Pre-Processing

According to the present example implementation, raw detector data for each single acquisition run is initially contained in HDF5 files according to the NeXus specification (Könnecke, M. et al. The NeXus data format. J. Appl. Crystallogr. 48, 301-305 (2015)), which is commonly used in X-ray diffraction. The diffraction data is arranged in a three-dimensional image stack, with a height $Kn_{cryst}+n_{aux}$, with $n_{cryst}$ the number of crystals in the sample region, K the number of dose-fractionation movie frames, and $n_{aux}$ the number of auxiliary points inserted as described above. Furthermore, the scan position list, the mapping STEM image with metadata for each found feature, and all accessible settings of the microscope, detector, and scanning unit, are stored within the NeXus file.

Starting with these raw input files, the following steps are performed to pre-process the data set for use in standard diffraction data reduction software. Using the Python package dask, all operations are performed using chunked lazy evaluation in a single calculation step, and efficiently scale on multi-processor systems, with only modest memory requirements; metadata are handled using the pandas package.

The recorded diffraction data are filtered such that all images corresponding to auxiliary scan points are removed. If dose-fractionation movies have been recorded, an effective integration time can now be set by summing a correspondingly large slice of the movie stack for each crystal. The latter process can be repeated such that sets with different integration times are available, which can be compared later on, or used for different steps of the pipeline.

Dead-pixel correction is applied by either replacing all dead pixels with a given integer number (typically −1 or NaN) or interpolating from adjacent pixels. Optionally, flat-field or detector saturation corrections can be applied by multiplying each pixel value with a previously determined normalization value, which can itself be a polynomial function of the pixel value. The pixels near the gaps of the detector panels, which are three times more elongated in the direction facing the gap and hence have a different effective gain and saturation behaviour, can either be omitted from the analysis, or scaled to have their intensity matched with the other pixels. In the present work, these pixels were omitted.

The centre of each diffraction pattern is determined in a multi-step process, and the images are correspondingly shifted, as even for a good alignment of the STEM pivot point before data acquisition, a slight position-dependent beam tilt can remain and manifest as displacement of the diffraction pattern, hampering the accuracy of the subsequent indexing step. First, the centre-of-mass of pixel intensities within the inner region of the image is found for each shot. Next, the obtained position is used as a starting value for least-squares fitting of a rotationally symmetric Lorentzian function over a small domain (30×30 pixels) around the centre-of-mass position. Finally, if peaks are found in the diffraction pattern, a refinement of the centre position is performed by matching the position of Friedel-mate reflections, which are generally found at low resolutions. Further refinement of the centre of each diffraction pattern is done at the indexing step (see below).

Optionally, the radially symmetric background in the diffraction patterns, which is caused by inelastic scattering events that do not contribute to Bragg peaks, can be subtracted. This is done by azimuthal integration at each radial pixel coordinate, whereby regions around each Bragg peak are ignored. The derived radial profiles are then median-filtered and subtracted from the images.

The final result of this pipeline is a data stack containing the corrected, dose-integrated and centred diffraction data and corresponding metadata of all diffraction shots, contained in NeXus-compatible HDF5 files. The data was successfully exported to the CrystFEL (White, T. A. et al. *CrystFEL: a software suite for snapshot serial crystallography. J. Appl. Crystallogr.* 45, 335-341 (2012), White, T. A. et al. *Recent developments in CrystFEL. J. Appl. Crystallogr.* 49, 680-689 (2016)), *DIALS* (Winter, G. et al. DIALS: Implementation and evaluation of a new integration package. Acta Crystallogr. Sect. D Struct. Biol. 74, 85-97 (2018)), and nXDS (Kabsch, W. *Processing of X-ray snapshots from crystals in random orientations. Acta Crystallogr. Sect. D Biol. Crystallogr.* 70, 2204-2216 (2014)) packages.

Data Reduction

To obtain a fully merged crystallographic data set from the single-crystal snapshots, the tools provided in *CrystFEL* 0.8.0 (White, T. A. et al. CrystFEL: a software suite for snapshot serial crystallography. J. Appl. Crystallogr. 45, 335-341 (2012), White, T. A. et al. Recent developments in CrystFEL. J. Appl. Crystallogr. 49, 680-689 (2016), White, T. A. Processing serial crystallography data with CrystFEL: a step-by-step guide. Acta Crystallogr. Sect. D Struct. Biol. 75, 219-233 (2019)) may be used. Bragg reflections in the diffraction patterns are registered using the peakfinder8 algorithm (Barty, A. et al. Cheetah: software for high-throughput reduction and analysis of serial fem to second X-ray diffraction data. J. Appl. Crystallogr. 47, 1118-1131 (2014)). Because this algorithm internally estimates the radially symmetric background for each resolution shell, it no increase of accuracy was found when background subtraction is applied to the diffraction patterns before peak finding. As the first frame of each dose-fractionation movie may still contain slight artefacts arising from residual beam motion, the reliability of peak finding can be increased by applying it to images summed from the stacks such that the first frame is excluded. Before the peak integration step, the first frame can be included again.

Indexing and Integration

One task encountered when processing a single electron diffraction pattern is to find the orientation of the crystal that generated this pattern. Due to the very short de Broglie wavelength of electrons (0.025 A at 200 kV, as compared to several A in the case of X-rays), the measured part of the Ewald sphere is almost flat in the resolution range used for the measurements. Therefore, hardly any three-dimensional information can be extracted from a single pattern. To overcome this limitation, prior unit-cell information can be used as a constraint, as it is done in various indexing algorithms, such as TakeTwo (Ginn, H. M. et al. TakeTwo: An indexing algorithm suited to still images with known crystal parameters. Acta Crystallogr. Sect. D Struct. Biol. 72, 956-965 (2016)), FELIX (Beyerlein, K. R. et al. FELIX: An algorithm for indexing multiple crystallites in X-ray free electron laser snapshot diffraction images. J. Appl. Crystallogr. 50, 1075-1083 (2017)), problematic (Smeets, S. & Wan, W. Serial electron crystallography: Merging diffraction data through rank aggregation. J. Appl. Crystallogr. 50, 885-892 (2017)), *SPIND* (Li, C. et al. SPIND: A reference-based auto-indexing algorithm for sparse serial crystallography data. IUCrJ 6, 72-84 (2019)), or *PinkIndexer* (Gevorkov, Y. et al. *pinkIndexer—a universal indexer for pink-beam X-ray and electron diffraction snapshots. Acta Crystallogr. Sect. A Found. Adv.* 76, (2020)). The present inventors found PinkIndexer, which can be used as a part of the CrystFEL package, to achieve the highest indexing rates for the data, at reasonable performance (roughly 30 seconds per pattern and CPU core at sufficiently fine sampling).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of performing serial electron crystallography, comprising:
    scanning an electron nanobeam among a plurality of scan locations within a sample region, the sample region comprising a plurality of crystals, and employing a detector to detect, at each scan location, a signal associated with scattered electrons, thereby collecting an image dataset mapping the sample region;
    processing the image dataset to identify crystals therein;
    determining a set of scanning parameters suitable for scanning the electron nanobeam among a respective set of crystal locations corresponding to at least a subset of the crystals identified in the image dataset;
    employing the set of scanning parameters to serially scan a collimated electron nanobeam among the respective set of crystal locations and employing a camera to collect at least one diffraction pattern at each of the crystal locations; and
    processing electron diffraction patterns obtained from at least a subset of the crystal locations to calculate a crystal structure of the crystals.

2. The method according to claim 1 wherein, while positioning the collimated electron nanobeam at a given crystal location, a set of electron diffraction patterns is sequentially collected, such that a net radiation dose delivered at the given crystal location is fractionated among the set of electron diffraction patterns.

3. The method according to claim 2 wherein the set of electron diffraction patterns are collected in the absence of a time delay between successive camera exposures.

4. The method according to claim 2 wherein a subset of electron diffraction patterns obtained at the given crystal location is selected for use when calculating the crystal structure.

5. The method according to claim 4 wherein selection of the subset of electron diffraction patterns is made after serial scanning of the electron nanobeam among the set of crystal locations.

6. The method according to claim 4 wherein the net dose delivered at the given crystal location is sufficient to cause radiation damage.

7. The method according to claim 4 wherein the subset of electron diffraction patterns consists of each diffraction pattern for which a corresponding radiation dose delivered to the given crystal location is less than a radiation dose threshold.

8. The method according to claim 4 wherein the subset of electron diffraction patterns consists of those diffraction patterns that satisfy quality criteria, such that diffraction patterns compromised by radiation damage are rejected.

9. The method according to claim 2 wherein, when calculating the crystal structure, a first subset of electron diffraction patterns is employed when performing indexing and a second subset of electron diffraction patterns is employed when performing integration, wherein a radiation dose corresponding to the first subset of electron diffraction patterns is greater than a radiation dose corresponding to the set of electron diffraction patterns.

10. The method according to claim 1 wherein the set of crystal locations correspond to crystals satisfying size criteria.

11. The method according to claim 10 wherein the size criteria is based on one or more of crystal morphology and transmitted electron intensity.

12. The method according to claim 1 wherein the electron nanobeam is focused when collecting the image dataset mapping the sample region.

13. The method according to claim 12 further comprising, prior to performing serial scanning of the electron nanobeam among the set of crystal locations:
    obtaining an additional image dataset mapping the sample region, wherein the additional image dataset is collected with the electron nanobeam in a collimated configuration;
    processing the image dataset and the additional image dataset to determine positional corrections for correcting a positional offset between focused and collimated beam configurations; and
    applying the positional corrections when scanning the electron nanobeam.

14. The method according to claim 1 wherein the electron nanobeam is collimated when collecting the image dataset mapping the sample region.

15. The method according to claim 1 wherein the electron nanobeam is scanned relative to the sample region using scanning coils.

16. The method according to claim 15 wherein the electron nanobeam is serially scanned among the crystal locations along a plurality of scan lines, and wherein the scanning parameters are configured such that the electron nanobeam is scanned to one or more auxiliary locations to avoid hysteresis effects associated with the scanning coils.

17. The method according to claim 1 wherein the electron nanobeam is scanned relative to the sample region by controlling translation of a sample stage relative to the electron nanobeam.

18. The method according to claim 1 wherein the image dataset is a first image dataset, the set of crystal locations are a first set of crystal locations, and the set of scanning parameters are a first set of scanning parameters, the method further comprising, prior to processing the electron diffraction patterns to calculate the crystal structure:
    tilting a sample stage supporting the crystals from a first angle to a second angle;
    scanning the electron nanobeam to collect a second image dataset mapping the sample region at the second angle;
    processing the first image dataset and the second image dataset to determine a coordinate transformation relating the first set of crystal locations to a second set of crystal locations associated with the second angle;

determining a second set of scanning parameters suitable for scanning the electron nanobeam among the second set of crystal locations at the second angle; and employing the second set of scanning parameters to serially scan the collimated electron nanobeam among the second set of crystal locations and employing the camera to collect at least one diffraction pattern at each crystal location of the second set of crystal locations.

19. The method according to claim 18 wherein the coordinate transformation is determined by performing image registration between the first image dataset and the second image dataset.

20. The method according to claim 1 wherein the electron nanobeam is scanned using a scanning transmission electron microscope adapted to serially scan the electron nanobeam according to a custom scanning pattern determined based on the crystals identified in the image dataset.

21. The method according to claim 1 wherein a timing of the collection of the diffraction patterns is synchronized with the serial scanning of the electron nanobeam.

22. The method according to claim 1 wherein a dwell time of the electron nanobeam at each crystal location is determined based on a frame rate of the camera.

23. The method according to any claim 1 wherein the detector is a high-angle annular dark field detector.

24. The method according to claim 1 wherein at least a portion of the processing of the electron diffraction patterns for the calculation of the crystal structure is performed while serially scanning the collimated electron nanobeam among the respective set of crystal locations.

25. The method according to claim 1 further comprising:
processing the image dataset to determine a measure of crystal morphology for at least one crystal; and
employing the measure of crystal morphology to restrict a search space of crystal orientations when performing indexing.

26. The method according to claim 1 further comprising:
processing the image dataset to determine a thickness measure for at least one crystal; and
employing the thickness measure to account for multiple electron scattering when performing crystal structure determination.

27. A system for performing serial electron crystallography, comprising:
an electron beam instrument capable of scanning an electron nanobeam relative to a sample region, the electron beam instrument comprising a detector and a camera; and
control and processing circuitry operatively coupled to the electron beam instrument, the control and processing circuitry comprising at least one processor and associated memory, the memory storing instructions executable by the at least one processor for performing operations comprising:
controlling the electron beam instrument to scan the electron nanobeam among a plurality of scan locations within the sample region and employing a detector to detect, at each scan location, a signal associated with scattered electrons, thereby collecting an image dataset mapping the sample region;
processing the image dataset to identify crystals therein;
determining a set of scanning parameters suitable for scanning the electron nanobeam among a respective set of crystal locations corresponding to at least a subset of the crystals identified in the image dataset;
employing the set of scanning parameters to serially scan a collimated electron nanobeam among the respective set of crystal locations and employing a camera to collect at least one diffraction pattern at each of the crystal locations; and
processing electron diffraction patterns obtained from at least a subset of the crystal locations to calculate a crystal structure of the crystals.

\* \* \* \* \*